(12) United States Patent
Ashraf et al.

(10) Patent No.: US 10,523,378 B2
(45) Date of Patent: Dec. 31, 2019

(54) DYNAMIC SELECTION OF MULTICARRIER MODE BASED ON QOS PARAMETERS

(71) Applicant: Telefonaktiebolaget LM Ericsson (publ), Stockholm (SE)

(72) Inventors: Shehzad Ali Ashraf, Aachen (DE); Junaid Ansari, Aachen (DE); Robert Baldemair, Solna (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 15/737,586

(22) PCT Filed: Nov. 10, 2015

(86) PCT No.: PCT/EP2015/076167
§ 371 (c)(1),
(2) Date: Dec. 18, 2017

(87) PCT Pub. No.: WO2016/206763
PCT Pub. Date: Dec. 29, 2016

(65) Prior Publication Data
US 2018/0191473 A1 Jul. 5, 2018

Related U.S. Application Data

(60) Provisional application No. 62/182,977, filed on Jun. 22, 2015.

(51) Int. Cl.
*H04L 12/801* (2013.01)
*H04L 12/24* (2006.01)
(Continued)

(52) U.S. Cl.
CPC .......... *H04L 5/0007* (2013.01); *H04L 5/0028* (2013.01); *H04L 5/0064* (2013.01);
(Continued)

(58) Field of Classification Search
CPC ... H04L 5/0007; H04L 5/0064; H04L 5/0028; H04W 72/0446
See application file for complete search history.

(56) References Cited

U.S. PATENT DOCUMENTS 9,100,981 B2 * 8/2015 Wengerter ............ H04L 1/0026
2007/0133701 A1 * 6/2007 Iwami ................. H04L 27/2605
375/260
(Continued)

FOREIGN PATENT DOCUMENTS

EP 2843892 A1 3/2015
EP 2911320 A1 8/2015
(Continued)

*Primary Examiner* — Brian S Roberts
*Assistant Examiner* — Abusayeed M Haque
(74) *Attorney, Agent, or Firm* — Murphy, Bilak & Homiller, PLLC

(57) ABSTRACT

In one aspect, a transmitter, for a first time interval, allocates first and second portions of a frequency band to first and second multicarrier modulation schemes with first and second subcarrier spacings that differ from one another. The data is transmitted to wireless devices in the first time interval using the first and second multicarrier modulation schemes in the first and second portions of the frequency band. For a second time interval, third and fourth non-overlapping portions of a frequency band are allocated to third and fourth multicarrier modulation schemes that have third and fourth subcarrier spacings that differ from one another. The third and fourth portions and/or schemes differ from the first and second portions and/or schemes. The data is transmitted in the second time interval using the third and fourth multicarrier modulation schemes in the third and fourth portions of the frequency band.

28 Claims, 20 Drawing Sheets

(51) Int. Cl.
*H04L 5/14* (2006.01)
*H04L 29/06* (2006.01)
*H04L 1/00* (2006.01)
*H04L 5/00* (2006.01)
H04L 27/26 (2006.01)
H04W 72/04 (2009.01)

(52) U.S. Cl.
CPC ........ *H04L 27/264* (2013.01); *H04L 27/2636* (2013.01); *H04W 72/0446* (2013.01)

(56) References Cited

U.S. PATENT DOCUMENTS

| | | | | |
|---|---|---|---|---|
| 2009/0103501 A1* | 4/2009 | Farrag | ................... | H04W 74/02 370/337 |
| 2009/0163199 A1* | 6/2009 | Kazmi | ................... | H04L 1/0026 455/425 |
| 2009/0219865 A1* | 9/2009 | Salzer | ................... | H04L 1/0026 370/329 |
| 2010/0027726 A1* | 2/2010 | Lin | ....................... | H04L 1/0053 375/346 |
| 2011/0134871 A1* | 6/2011 | Nogami | ................ | H04L 5/0044 370/329 |
| 2011/0274077 A1* | 11/2011 | Yamada | .............. | H04W 72/042 370/329 |
| 2013/0308475 A1* | 11/2013 | Celebi | ............... | H04W 72/1231 370/252 |
| 2015/0092645 A1* | 4/2015 | Tabet | .................... | H04L 1/1825 370/311 |
| 2015/0094085 A1* | 4/2015 | Agrawal | .............. | A01K 1/0114 455/456.1 |
| 2018/0049058 A1* | 2/2018 | Faronius | ................... | H04L 1/08 |

FOREIGN PATENT DOCUMENTS

| | | |
|---|---|---|
| JP | 2007159066 A | 6/2007 |
| WO | 2008097038 A2 | 8/2008 |
| WO | 2011043392 A1 | 4/2011 |
| WO | 2014060037 A1 | 4/2014 |
| WO | 2014065568 A1 | 5/2014 |
| WO | 2016068072 A1 | 5/2016 |
| WO | 2016209139 A1 | 12/2016 |
| WO | 2017005295 A1 | 1/2017 |

\* cited by examiner

DYNAMIC SELECTION OF MULTICARRIER MODE BASED ON QOS PARAMETERS

TECHNICAL FIELD

The present invention generally relates to wireless communication networks, and particularly relates to multicarrier modulation and demodulation.

BACKGROUND

The so-called Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms, as shown in FIG. 2. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled: in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe, and the number n=1, 2, 3 or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3. The reference symbols shown in FIG. 3 are the cell-specific reference symbols (CRS) and are used to support multiple functions including fine time and frequency synchronization and channel estimation for certain transmission modes.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices in machine type communications (MTC), continue to be developed. These market forces indicate that a wireless communications technology with improved flexibility is needed, to better match the variety of service requirements for mobile data applications.

SUMMARY

Narrow and wider subcarriers favor different types of services. The current LTE standard uses fixed subcarrier spacing and, therefore, is less flexible when it comes to satisfying highly varying Quality-of-service (QoS) requirements. This is particularly true with respect to time-critical services. A new physical layer design, which may be employed as a next generation or "5G" radio access technology (RAT), uses smaller and variable sized subframes with its mixed mode operation, but it is recognized herein that there is a need for methods and apparatus for utilizing the scalability defined for the new RAT in a dynamic way for adapting to current QoS needs. The embodiments described herein provide apparatuses and methods for selecting and (re)configuring subcarriers based on the required QoS metrics. This may include, for example, schemes for selection of different subcarrier configurations and adapting them based on the required QoS demands. The configuration parameters can include subcarrier and symbol lengths in the new RAT.

The described embodiments provide dynamic operations to efficiently support different services. In an example, a base station decides, depending upon the type of scheduling request (SR), whether or not to allocate a dedicated resource. For instance, an emergency alarm with very short data size could directly be sent on a control channel instead of exercising the classical mechanism of first sending a SR.

In another example, either the base station or the device terminal decides, depending upon the service class and/or device capability, which type of OFDM subcarrier spacing has to be allocated to fulfill the QoS requirements.

In a further example, the base station decides, which of the allocated resources has to be freed and reallocated (when possible) in order to support emergent new real time traffic, considering the number of resources and device capability constraints to ensure that the QoS expectations are met. The reallocation of resources can use an entirely new multicarrier (i.e., OFDM, filter bank multicarrier (FBMC), etc.) numerology, compared to the numerology for the previous allocation.

In another example, a subset of system bandwidth is dynamically (on a sub frame basis) allocated to different sub-carrier spacing depending on the current QoS needs.

According to some embodiments, a method includes, for a first time interval, allocating first and second non-overlapping portions of a frequency band to first and second multicarrier modulation schemes, respectively. The first and second multicarrier modulation schemes have first and second subcarrier spacings, respectively, and the first and second subcarrier spacings differ from one another. The method may include transmitting data to one or more wireless devices in the first time interval, using the first and second multicarrier modulation schemes in the first and second portions of the frequency band. The method further includes, for a second time interval, allocating third and fourth non-overlapping portions of a frequency band to third and fourth multicarrier modulation schemes, respectively. The third and fourth multicarrier modulation schemes have third and fourth subcarrier spacings, respectively, and the third and fourth subcarrier spacings differ from one another. The third and fourth portions differ from the first and second portions or the third and fourth multicarrier modulation schemes differ from the first and second multicarrier modulation schemes, or both. The method may also include transmitting data to one or more wireless devices in the second time interval, using the third and fourth multicarrier modulation schemes in the third and fourth portions of the frequency band.

According to some embodiments, a method includes, in a first time interval, receiving and demodulating data from a first portion of a frequency band, using a first multicarrier modulating scheme having a first subcarrier spacing. The method further includes, in a second time interval, receiving and demodulating data from a second portion of the frequency band, using a second multicarrier modulating scheme having a second subcarrier spacing. The first subcarrier spacing differs from the second subcarrier spacing.

According to some embodiments, a wireless transmitter includes a transceiver configured to transmit and receive wireless transmissions according to multicarrier modulation schemes, and a processing circuit operatively connected to the transceiver. The processing circuit is configured to, for a first time interval, allocate first and second non-overlapping portions of a frequency band to first and second multicarrier modulation schemes, respectively. The first and second multicarrier modulation schemes have first and second subcarrier spacings, respectively, and the first and second subcarrier spacings differ from one another. The processing circuit may also be configured to transmit data, via the transceiver, to one or more wireless devices in the first time interval, using the first and second multicarrier modulation schemes in the first and second portions of the frequency band. The processing circuit is configured to, for a second time interval, allocate third and fourth non-overlapping portions of a frequency band to third and fourth multicarrier modulation schemes, respectively. The third and fourth multicarrier modulation schemes have third and fourth subcarrier spacings, respectively, and the third and fourth subcarrier spacings differ from one another. The third and fourth portions differ from the first and second portions or the third and fourth multicarrier modulation schemes differ from the first and second multicarrier modulation schemes, or both. The processing circuit may also be configured to transmit data, via the transceiver, to one or more wireless devices in the second time interval, using the third and fourth multicarrier modulation schemes in the third and fourth portions of the frequency band.

According to some embodiments, a wireless receiver includes a transceiver configured to transmit and receive wireless transmissions according to multicarrier modulation schemes, and a processing circuit operatively connected to the transceiver. The processing circuit is configured to, in a first time interval, receive and demodulate data from a first portion of a frequency band, using a first multicarrier modulating scheme having a first subcarrier spacing. The processing circuit is also configured to, in a second time interval, receive and demodulate data from a second portion of the frequency band, using a second multicarrier modulating scheme having a second subcarrier spacing. The first subcarrier spacing differs from the second subcarrier spacing.

Of course, the present invention is not limited to the above features and advantages. Those of ordinary skill in the art will recognize additional features and advantages upon reading the following detailed description, and upon viewing the accompanying drawings.

DETAILED DESCRIPTION

There has been fast growth in the number of wireless devices and applications in recent years, and this trend is likely to continue in the future. With the emergence of new applications with highly varying application needs, i.e., quality of service (QoS) parameters and deployment scenarios, a single, inflexible, physical-layer technology is not adequate to achieve the desired performance characteristics. In this context, a highly flexible physical layer for a future generation of cellular networks is currently being designed. This new physical layer design is geared towards fulfilling a wide range of varying QoS requirements including latency, reliability and throughput. The scalability is proposed to be adapted using different subcarrier spacing. Another feature proposed for this new physical layer is that it should support mixed mode operation, which allows different subcarrier spacings to simultaneously coexist within the same frequency band.

Thus, in future networks, such as in "5G" networks, multi-mode multicarrier configuration is envisioned to meet the varying QoS requirements of different applications and services. New numerology proposed herein, which can support different subcarrier spacings (or, correspondingly, different OFDM symbol sizes) and the numerology is being defined in a way such that different OFDM symbol lengths fit together very well, so as to facilitate inter-operability of different OFDM configurations.

Figure 1:
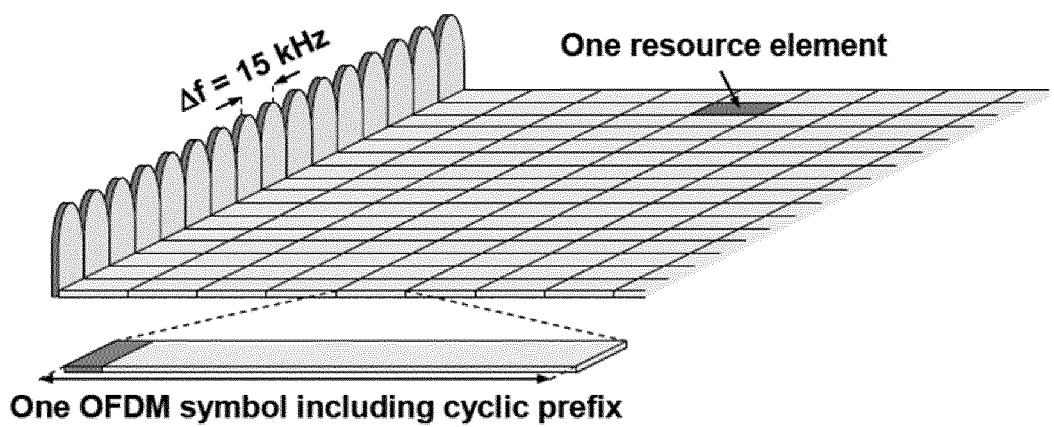
FIG. 1 illustrates a diagram illustrating an LTE downlink physical resource.
Figure 2:
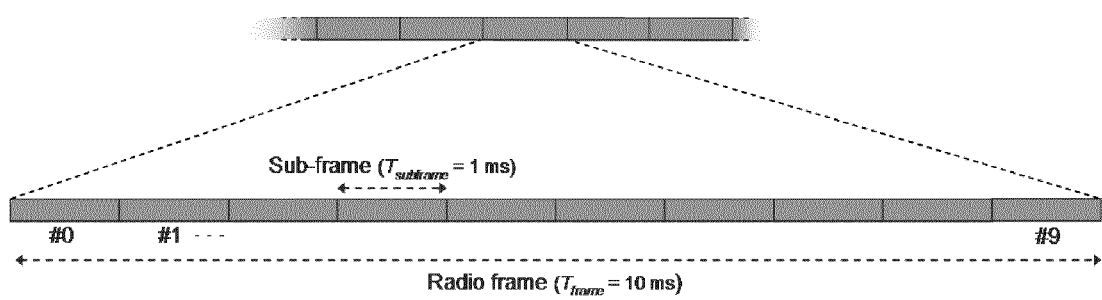
FIG. 2 illustrates a diagram of an LTE time-domain structure.
Figure 3:
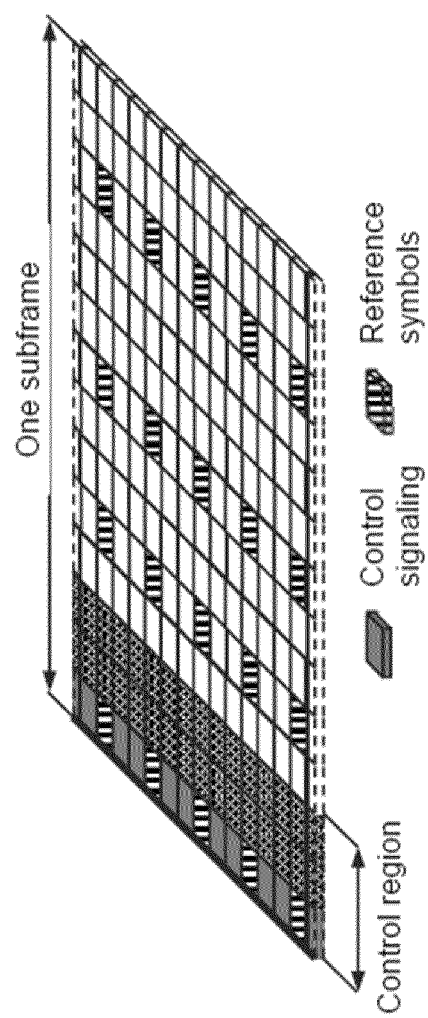
FIG. 3 illustrates a diagram of a downlink subframe.
Figure 4:
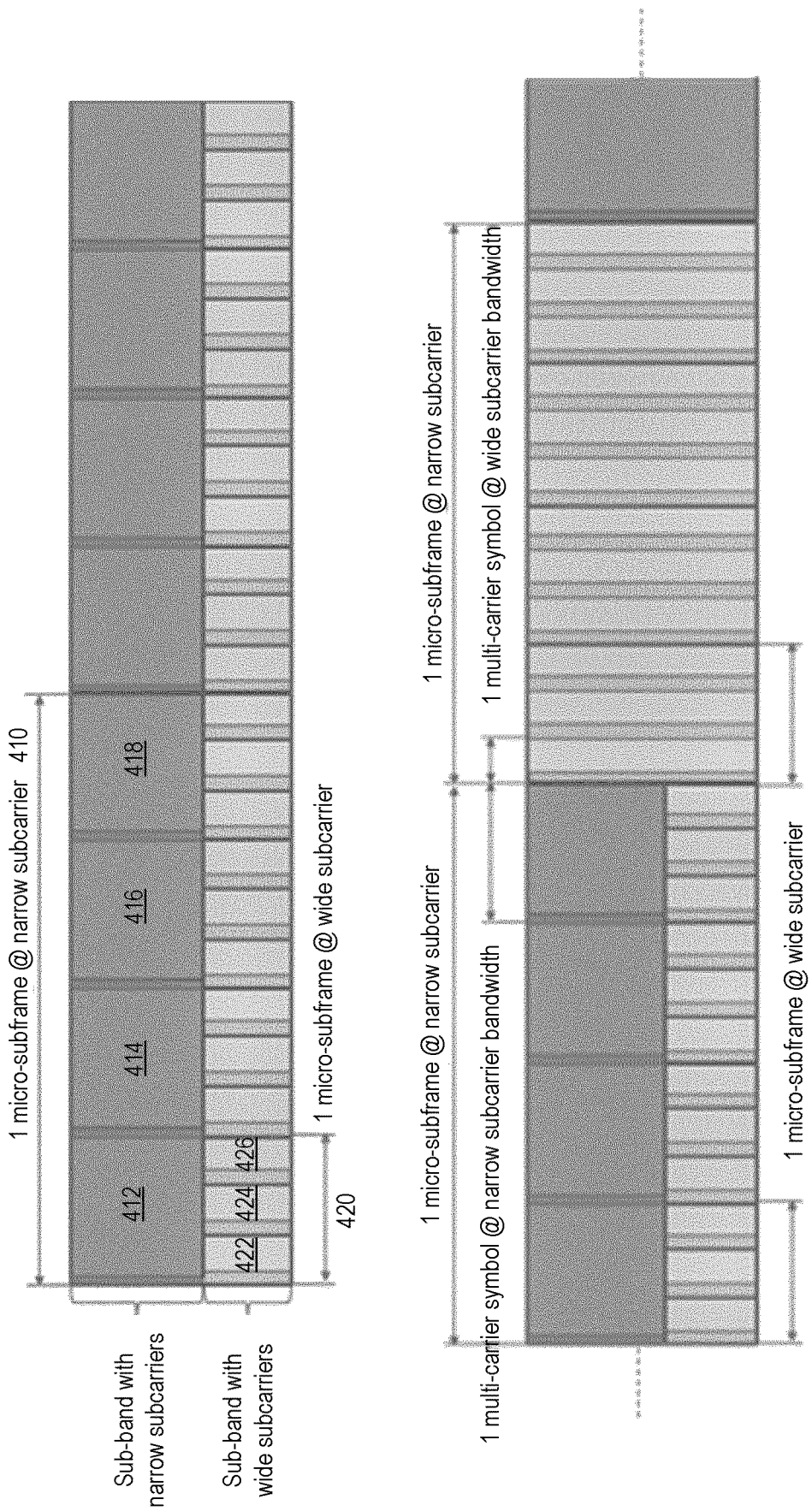
FIG. 4 illustrates multi-mode configurations, according to some embodiments.

FIG. 4 illustrates two cases of multi-mode configurations, as a non-limiting example. Here, micro-subframes are defined—each micro-subframe can be equal to a few OFDM symbols. As an example, one micro-subframe 410 in FIG. 4 is shown to consist of four "long" OFDM symbols 412, 414, 416 and 418. (Each symbol in the illustration includes a cyclic prefix.) It should be noted here that the new numerology allows inter-operability of different multicarrier modulation modes, characterized by different sub-carrier spacings and/or different symbol lengths. In the example illustrated in FIG. 4, one micro-subframe 410 with narrow subcarrier spacing and correspondingly long OFDM symbols 412, 414, 416, and 418, is equal to four micro-subframes 420 with wide subcarrier spacing and correspondingly short OFDM symbols 422, 424, 426, etc.

It should be noted that while FIG. 4 illustrates examples where two multicarrier modulation modes are used, more than two modes can also be supported in a mixed mode OFDM framework. Those familiar with the details of OFDM modulators and demodulators will appreciate that the mode selection, i.e., the selection of the OFDM symbol length and the sub-carrier spacing for a given multicarrier modulation mode, can be achieved by appropriate selection of the FFT/iFFT size used to modulate and demodulate the signal, in combination with a given sample rate. In LTE, the subcarrier spacing is fixed at 15 kHz, and the symbol duration is set so that either 7 symbols ("normal" cyclic prefix) or 6 symbols (extended cyclic prefix) fit within a 500 microsecond slot. With the approach described here, a multicarrier modulation mode like (if not identical to) the OFDM modulation used in LTE can be used in the same frequency band, and at the same time, as one or more other multicarrier modulation modes having, for example, wider subcarrier spacings and shorter symbol lengths.

One of the issues with the existing LTE standard is that it uses a fixed large-sized subframe structure, which results in resource wastage for very small-sized data as is often the case in critical MTC (C-MTC) scenarios. Moreover, due to relatively coarse time granularity, the LTE resource blocks simply do not meet the very low latency requirements of C-MTC applications. A second issue with the existing LTE standard is that all the different services are bound to using the same subframe structure; the subframe cannot be split among different users in order to support any emerging time-critical data services for C-MTC applications.

Both of these issues are addressed by the multi-mode techniques detailed herein. C-MTC applications can be serviced with, for example, a multicarrier modulation mode having a relatively wide subcarrier spacing and relatively short OFDM symbol lengths, e.g., as compared to those used in LTE. This, in turn, facilitates communication with these applications using relatively shorter micro-subframes, such as the micro-subframes 420 shown in FIG. 4.

Described herein are apparatuses and methods for selecting and (re)configuring subcarrier spacing based on the required QoS metrics. These include, for example, a system that adapts selection of the multicarrier modulation mode (e.g., subcarrier spacing and micro-subframe duration) based on the quality of service requirements, while allowing different subframes to coexist in the mixed-mode multicarrier setup. Such a system further allows the possibility of reallocation of resources in the event of emergent time-critical traffic or other quickly changed QoS demands.

It should be understood that Orthogonal Frequency-Division Multiplexing (OFDM) is but one example of a multicarrier modulation technique. Other examples include discrete-Fourier-transform-spread (DFT-spread or DFTS-) OFDM, which is also referred to as single-carrier frequency-division multiple access (SC-FDMA) or precoded OFDM. Still other examples include filter-bank multicarrier (FBMC) modulation, pre-coded FBMC, and Generalized Frequency-Division Multiplexing (GFDM). Those familiar with these techniques will recognize that the digital signal processing for each of these techniques will vary, but should appreciate that any one or more of these multicarrier modulation techniques may be employed in the multi-mode schemes detailed herein—accordingly, where example embodiments are described herein in terms of OFDM, the described techniques and apparatus may employ one or more other multicarrier modulation techniques in addition to or instead of OFDM.

Figure 5:
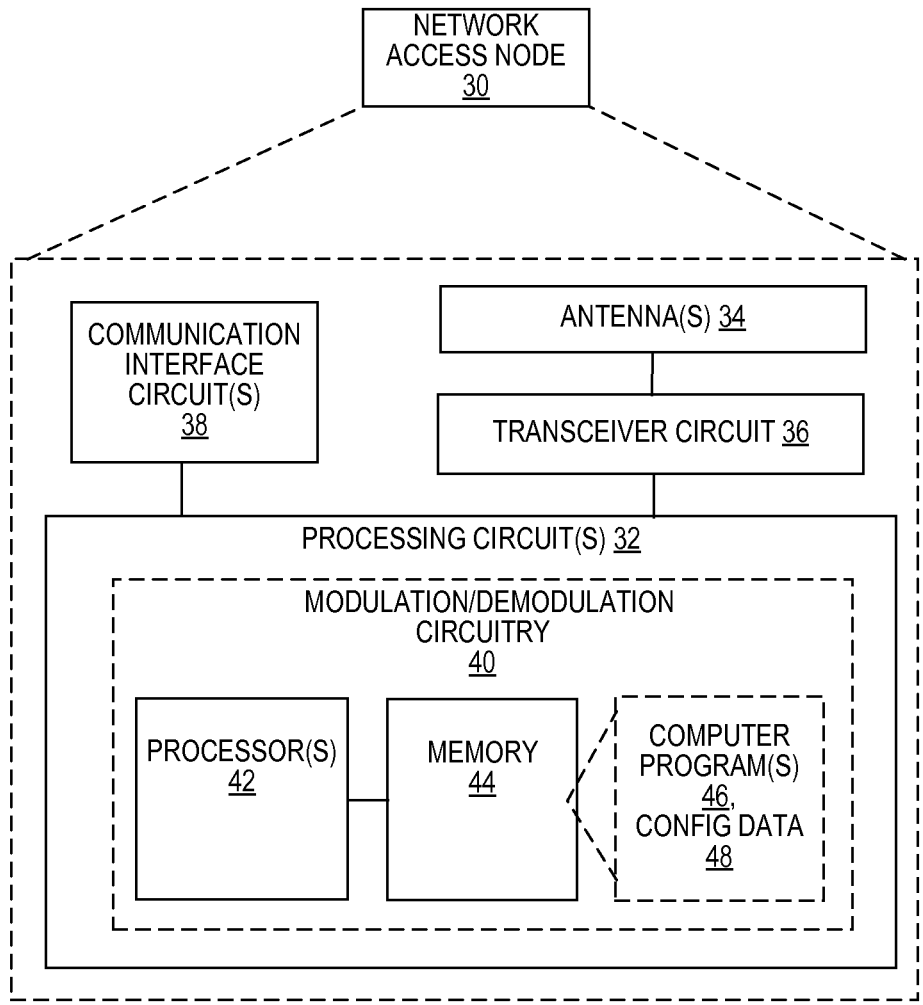
FIG. 5 illustrates a block diagram of a network access node, according to some embodiments.

FIG. 5 illustrates a diagram of a network access node 30, such as a base station, according to some embodiments. The network node 30 facilitates communication between wireless devices and the core network. The network access node 30 includes a communication interface circuit 38 includes circuitry for communicating with other nodes in the core network, radio nodes, and/or other types of nodes in the network for the purposes of providing data and cellular communication services. The network access node 30 communicates with wireless devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network access node 30 also includes one or more processing circuits 32 that are operatively associated with the communication interface circuit 38 or transceiver circuit 36. The network access node 30 uses the communication interface circuit 38 to communicate with network nodes and the transceiver 36 to communicate with user equipments. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network access node 30. Here, "non-transitory" means permanent, semi-permanent, or at least temporarily persistent storage and encompasses both long-term storage in non-volatile memory and storage in working memory, e.g., for program execution.

Processing circuitry 32, whether alone or in combination with other digital hardware, is configured to perform one or more multicarrier modulation techniques (for network access node 30 acting as a transmitter node) and/or one or more multicarrier demodulation techniques (for network access node 30 acting as a receiver node). An example modulation technique is shown in FIG. 6.

Figure 6:
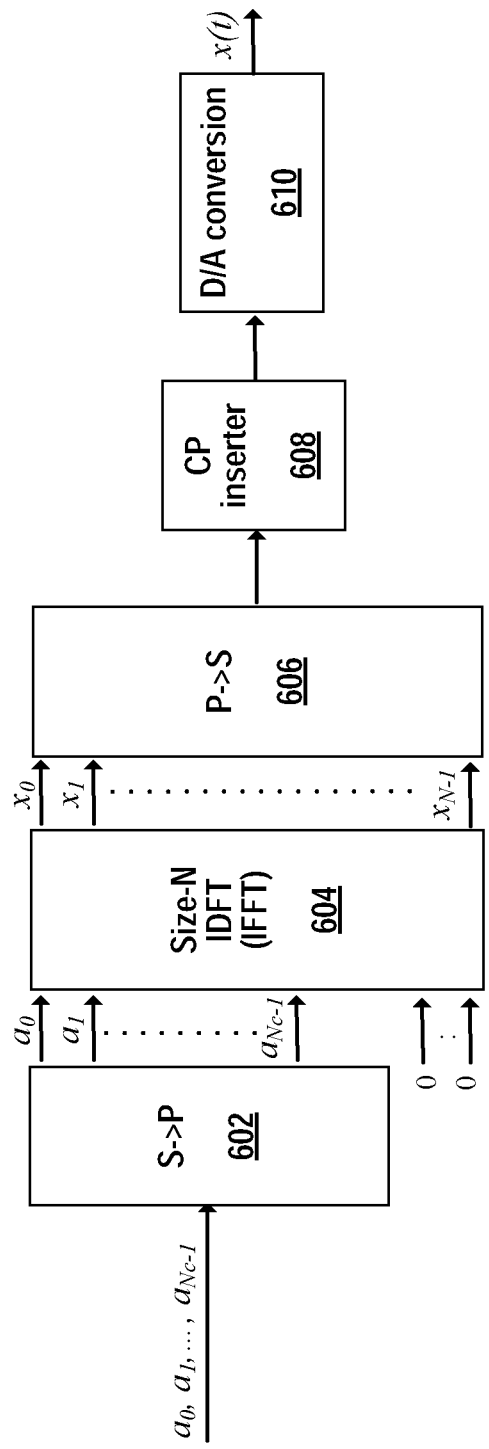
FIG. 6 illustrates a block diagram of an OFDM modulation scheme that can be used in some embodiments.

FIG. 6 illustrates OFDM modulation using an Inverse Fast Fourier Transform (IFFT) or, more generally, and Inverse Discrete Fourier Transform (IDFT). As will be explained in further detail below, two or more simultaneous instantiations of the signal processing configuration shown in FIG. 6 can be used for multi-mode operation. As indicated by the diagrams of FIG. 4, the number of OFDM subcarriers Nc and the subcarrier spacing can vary. The number of subcarriers Nc can range from fewer than a hundred to several thousand, depending on the subcarrier spacing that is selected and the overall transmission bandwidth.

As illustrated by FIG. 6, during each OFDM time interval with period T, Nc modulated symbols a0 to aNc-1 are provided to the size-N IDFT 604 by the serial to parallel converter 602. The IFFT size corresponds to the total number of subcarriers that may be generated; the actual number of generated subcarriers is Nc in FIG. 6.

The parallel output of IDFT 604 is converted to a serial time sequence by parallel to serial converter 606. Cyclic prefix inserter 608 inserts a copy of part of the OFDM symbol at the beginning of the OFDM symbol, to make the OFDM signal less sensitive to time dispersion. Following the digital to analog conversion by converter 610, the final output signal x(t) is then prepared for transmission.

Figure 7:
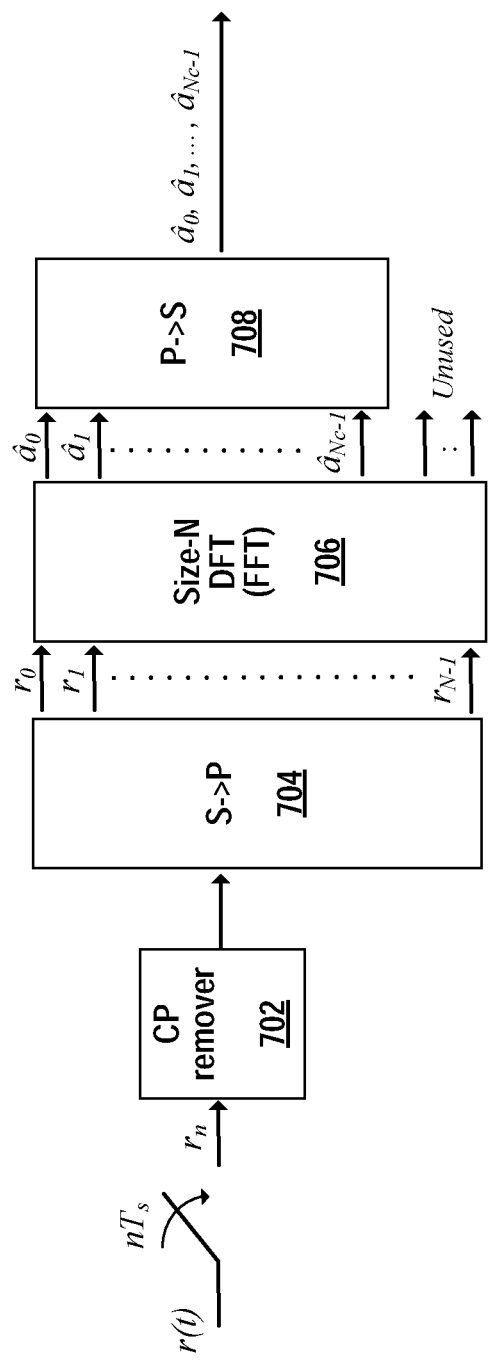
FIG. 7 illustrates a block diagram of an OFDM demodulation scheme that can be used in some embodiments.

FIG. 7 illustrates demodulation using FFT processing or, more generally, DFT processing. The received signal r(t) is sampled, and has its cyclic prefix removed by CP remover 702. The serial to parallel converter 704 provides the samples of the OFDM symbol to the size-N DFT 706, which extracts the data symbol values from the multiple subcarriers of the modulated signal. These data symbols are then converted to a serial stream of data symbols by parallel-to-serial converter 708. These data symbols are then individually demodulated and the resulting data is decoded.

Figure 8:
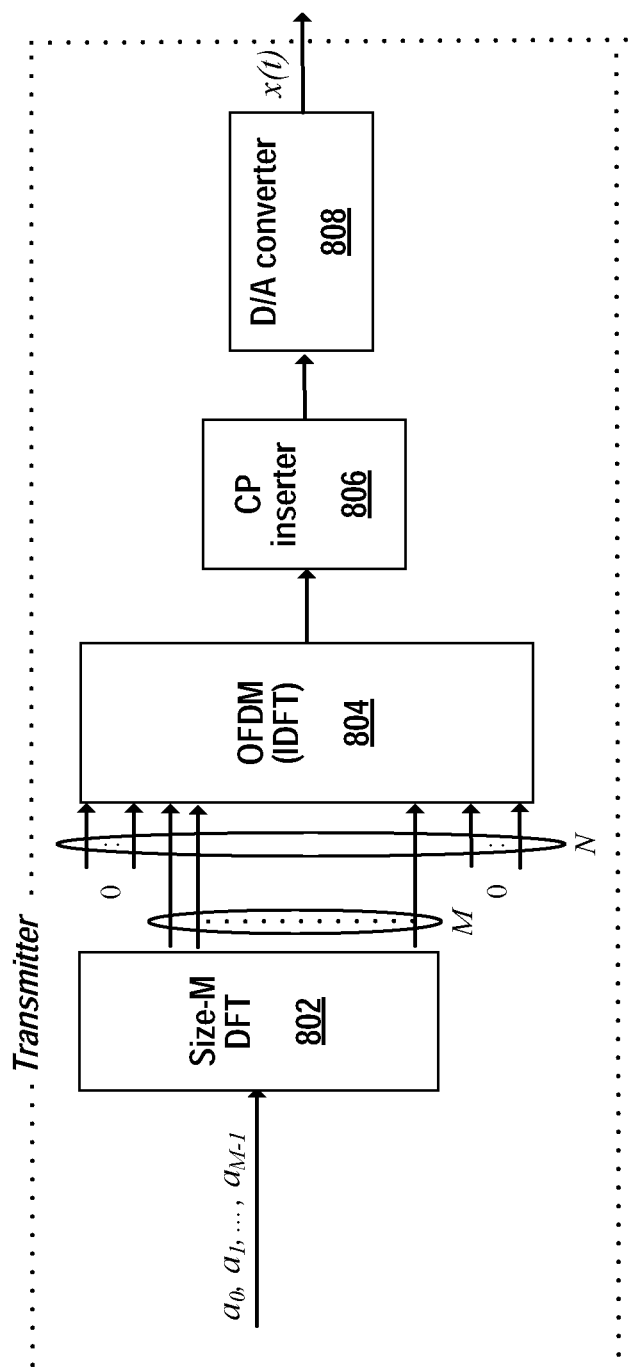
FIG. 8 illustrates a block diagram of a DFTS-OFDM modulation scheme that can be used in some embodiments.

FIG. 8 illustrates OFDM modulation with DFT-based precoding, or DFT-Spread OFDM (DFTS-OFDM), which can be referred to as single-carrier frequency division multiple access (SC-FDMA). A block of M modulation symbols is applied to Size-M DFT 802. The output of the DFT 802 is then applied to inputs of an OFDM modulator 804 that is implemented as a size-N IDFT; each input of the OFDM modulator 804 corresponds to a subcarrier of the resulting modulated signal. After conversion of the IDFT output to a time sequence in OFDM modulator 804, cyclic prefix inserter 806 inserts a cyclic prefix. Finally, output signal x(t) is output following conversion by digital-to-analog converter 808.

Figure 9:
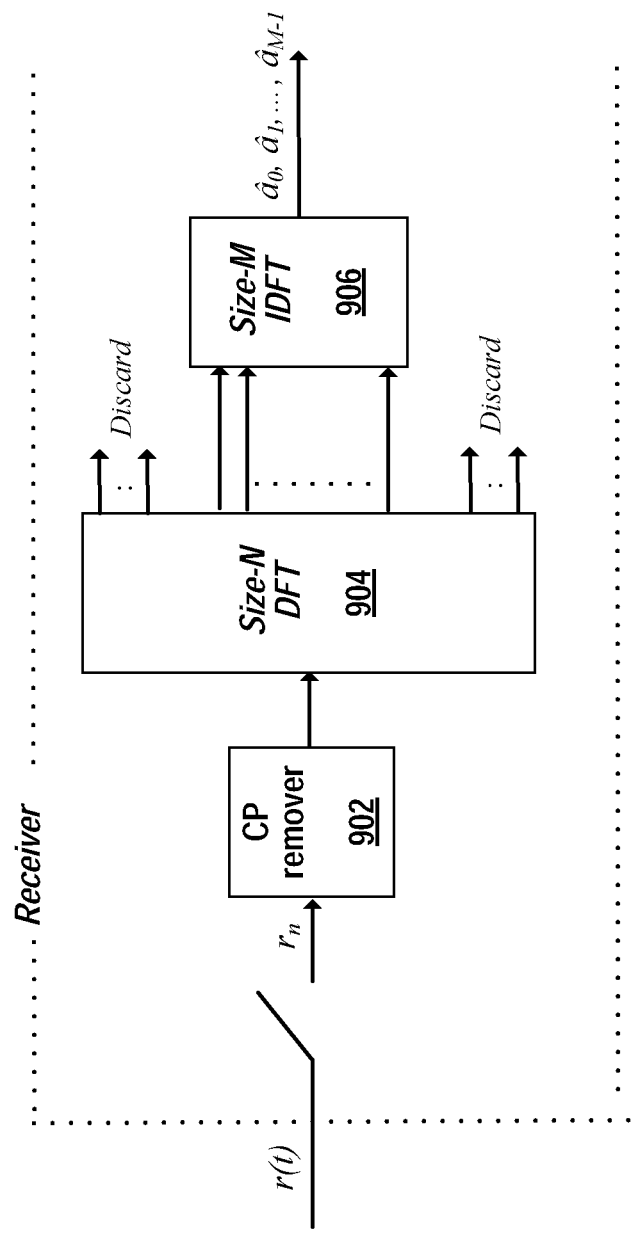
FIG. 9 illustrates a block diagram of a DFTS-OFDM demodulation scheme that can be used in some embodiments.

FIG. 9 illustrates DFTS-OFDM demodulation where a received signal r(t) is processed by cyclic prefix remover 902, Size-N DFT 904 and Size-M IDFT 906. It will be appreciated that the DFTS-OFDM demodulator shown in FIG. 9 is similar to the OFDM demodulator of FIG. 7, but with the size-M IDFT 906 added.

As previously mentioned, although OFDM and DFTS-OFDM are described as example multicarrier modulation/demodulation techniques, the embodiments of the present invention are not limited to such techniques. Also, it is noted that any equalization (which may be done in the frequency domain, for example) is omitted from the figures for simplicity.

Figure 10:
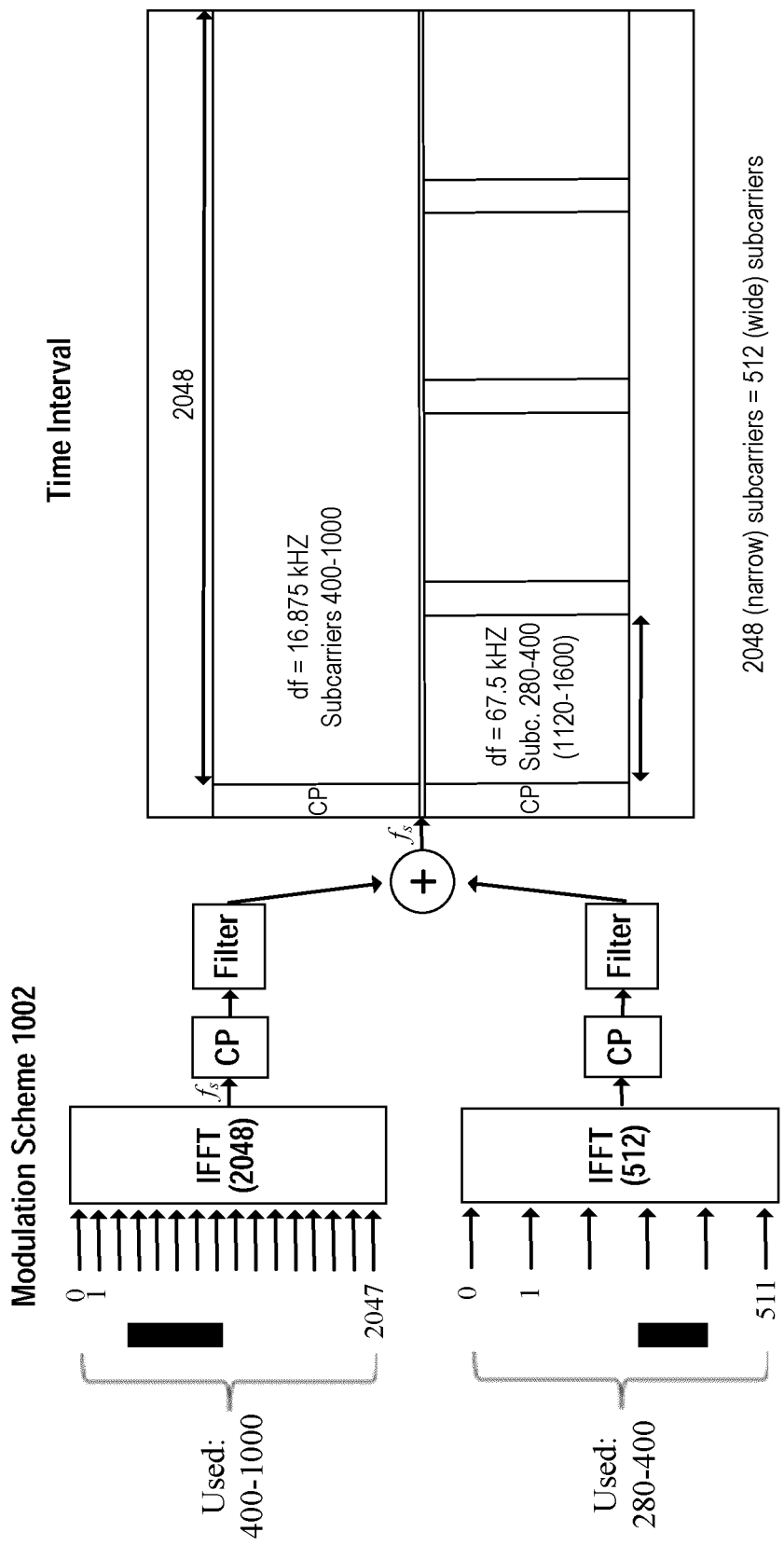
FIG. 10 illustrates signal generation using multiple IFFT modulation schemes in each time interval, according to some embodiments.

The IFFT size can be selected for modulation schemes with different numerologies, or variants of transmission parameters. The resulting allocations can provide for symbols with different subcarrier spacings in different frequency band portions of the same time interval. For example, FIG. 10 shows two simultaneously applied multicarrier modulators 1002 and 1004. Modulator 1002 operates with an IFFT size of 2048, and is capable of outputting 2048 relatively narrow modulated subcarriers, while modulator 1004 operates with an IFFT size of 512. Modulator 1004 produces up to 512 subcarriers that are four times as wide as those from modulator 1002, while also producing symbols that are one-fourth as length.

In the illustrated example, subcarriers 400-1000 of modulator 1002 are generated, each having a bandwidth of 16.875 kHz, while the subcarriers 280-400 from modulator 1004 each have a bandwidth of 67.5 kHz. It will be appreciated that the ranges of inputs used in modulators 1002 and 1004 are selected so that the resulting subcarriers do not land on each other. In the illustrated example, the 121 relatively wide subcarriers from modulator 1004 correspond to the portion of the spectrum that would be occupied by subcarriers 1120-1600 of modulator 1002. The corresponding inputs of modulator are thus not used. This provides a small gap, in the frequency domain, between the outputs from the two multicarrier modulators, which means that the two modulated signals can simply be added to one another, in the time domain, before transmission. The result is that in a given time interval, modulation scheme 1002 provides longer blocks of symbols for a first non-overlapping portion of the frequency band, while modulation scheme 1004 provides shorter blocks of symbols in a greater number of spacings in a second non-overlapping portion of the frequency band. As a result, symbols can be directed to different receiver nodes using different subcarrier spacings, all within the same time interval.

Embodiments of the present invention provide for the use of different multicarrier modulation schemes for different portions of the frequency band. Multicarrier modulation schemes may be different in that the modulation schemes may use different underlying techniques, or may use different numerology/subcarrier spacing, or a combination of both. For example, one modulation scheme may use OFDM, while another, differing, modulation scheme may use DFTS-OFDM or FBMC. Similarly, two differing multicarrier schemes may both use OFDM, but with different subcarrier spacings.

Further, the portions of the frequency band that are allocated to any given multicarrier modulation scheme may be dynamically changed, from one time interval to the next. This means that the subcarrier spacing and symbol durations can differ in different portions of the frequency band. While two multicarrier modulation schemes are combined in the example shown in FIG. 10, it will be appreciated that this can be extended to three, four, or more multicarrier modulation schemes, so long as non-colliding portions of the frequency band are allocated to the multiple modulators.

The different subcarrier spacings and symbol spacings for different portions of the frequency band can be determined from one time interval to the next based on service requirements, such as QoS requirements. The time interval can utilize various modulation schemes for various portions of the time intervals to better maximize the usage of the bandwidth while satisfying the service requirements of various devices or services.

According to various embodiments described herein, a transmitter and/or a receiver can perform communications using the multicarrier modulation and demodulation techniques described in FIGS. 6-10, or other multicarrier modulation techniques, while accounting for varying service requirements. The transmitter and/or receiver may be a network access node (e.g., base station) or a wireless device (e.g., UE). For example, the processor 42 of the processing circuit 32 of network access node 30 may execute a computer program 46 stored in the memory 44 that configures the processor 42 to operate the network access node 30 as a transmitter node that performs multicarrier modulation. Processing circuit 32 may comprise specialized digital hardware for performing DFT/IDFT processing, in cooperation with one or more program-based processors, in some embodiments. The processor 42 is configured to, for a first time interval, allocate first and second non-overlapping portions of a frequency band to first and second multicarrier modulation schemes, respectively. The first and second multicarrier modulation schemes have first and second subcarrier spacings, respectively, and the first and second subcarrier spacings differ from one another. The processor 42 is also configured to transmit, using transceiver circuit 36, data to one or more wireless devices in the first time interval, using the first and second multicarrier modulation schemes in the first and second portions of the frequency band.

The processor 42 is also configured to, for a second time interval, allocate third and fourth non-overlapping portions of a frequency band to third and fourth multicarrier modulation schemes, respectively. The third and fourth multicarrier modulation schemes have third and fourth subcarrier spacings, respectively, and the third and fourth subcarrier spacings differ from one another. The third and fourth portions differ from the first and second portions or the third and fourth multicarrier modulation schemes differ from the first and second multicarrier modulation schemes, or both. To be clear, if both, this means that the third and fourth portions differ from the first and second portions and the third and fourth multicarrier modulation schemes differ from the first and second multicarrier modulation schemes. The processor 42 is also configured to transmit data, using transceiver circuit 36, to one or more wireless devices in the second time interval, using the third and fourth multicarrier modulation schemes in the third and fourth portions of the frequency band. This structure and functionality may be referred to as modulation/demodulation circuitry 40 in the processing circuit 32.

In stating that the third and fourth portions or modulation schemes differ from the first and second portions or modulation schemes, it is not necessary that the third and fourth portions or modulation schemes both be different than both the first and second portions or modulation schemes. In some cases, the third portion or modulation scheme can be the same as the first portion or modulation scheme, it is just that the fourth portion or modulation scheme differs from the second portion or modulation scheme. Likewise, the second and fourth portions or modulation schemes can be the same, while the first and third portions or modulation schemes are different. Of course, in some cases, all four portions or modulations schemes can be completely different from each of the other portions or modulations schemes. It is noted that the references herein to first, second, third and fourth portions or modulations schemes are used for explanatory purposes and do not limit the embodiments to only two portions or modulation schemes in each time interval.

An example of the third and fourth portions differing from the first and second portions can include an instance where the first portion of the frequency band is larger than the second portion in the first time interval, but the fourth portion is larger than the third portion in the second time interval. In another non-limiting example, the third and fourth portions differ from the first and second portions because the first and third portions are the same, but the fourth portion is larger than the third and second portions, such as in FIG. 15, which is an example signal diagram of mixed mode OFDM for consecutive time intervals. In still another example, the sizes of the two portions in the first time interval may be the same as the respective sizes of the two portions in the second time interval, but the locations within the frequency band of one or both of the portions may vary from one time interval to the next.

An example of the third and fourth modulation schemes differing from the first and second modulation schemes can include where the underlying interference schemes differ. For instance, this may be where the first and second modulation schemes of the first time interval and the third modulation scheme of the second interval are, for example, OFDM while the fourth modulation scheme is, for example, DFTS-OFDM.

In another example, the modulation schemes may differ in subcarrier spacing. For example, the first modulation scheme may have a greater number of smaller subcarrier spacings than the second modulation scheme in the first interval, while the fourth modulation scheme may have a greater number of smaller subcarrier spacings than the third modulation scheme in the second interval. In another non-limiting example, the third and fourth modulation schemes may differ from the first and second modulation schemes when the second modulation scheme has a greater number of smaller subcarrier spacings than the first modulation scheme, while the third and fourth modulation schemes have the same number of subcarrier spacings as the first modulation but a different number than the second modulation scheme, such as in FIG. 15.

Figure 11:
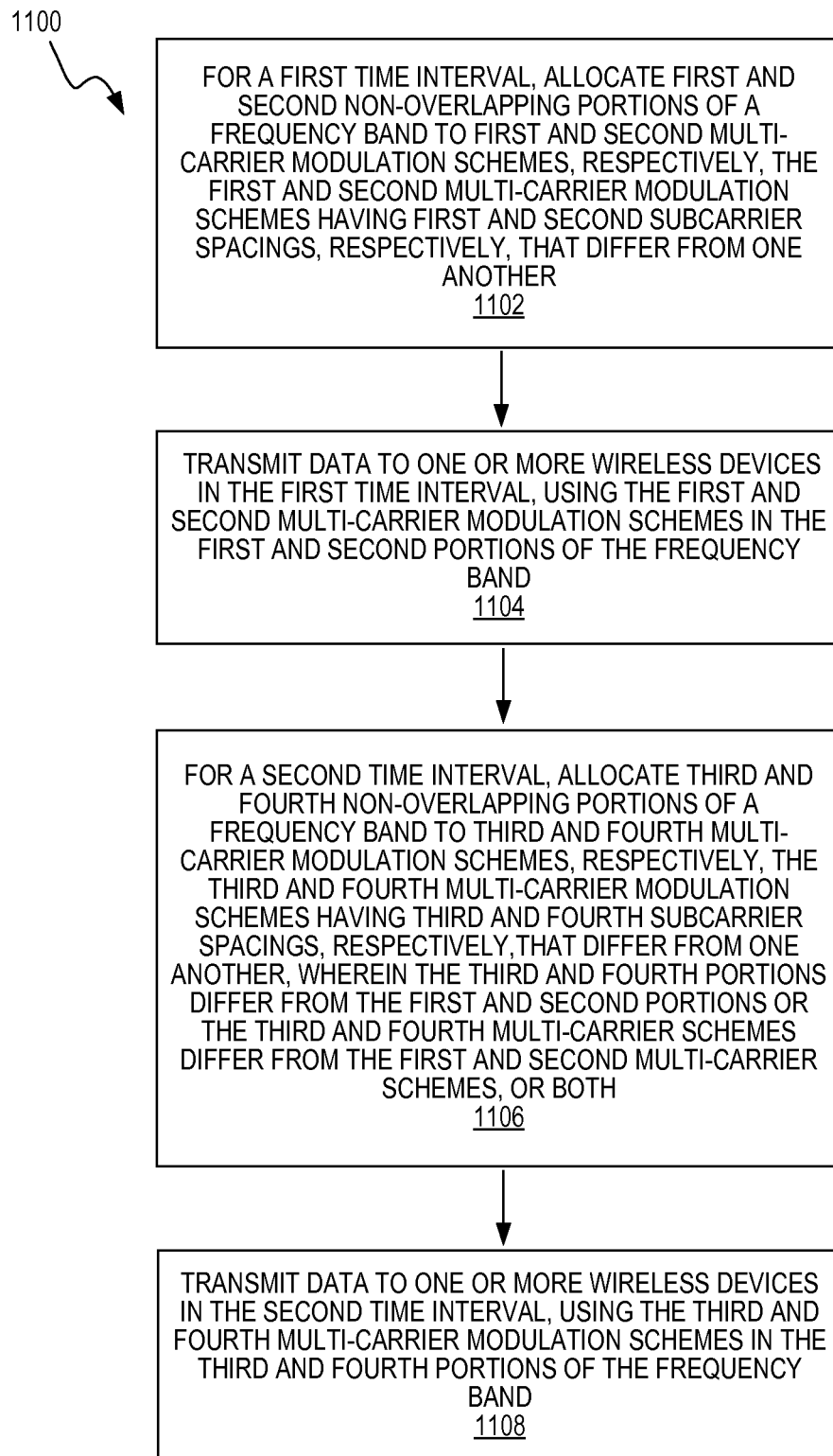
FIG. 11 illustrates a method in a transmitter node for multicarrier modulation, according to some embodiments.

In some embodiments, the processing circuit 32 is configured to perform a method for multicarrier modulation, such as method 1100. For example, FIG. 11 illustrates a method 1100 that includes, for a first time interval, allocating first and second non-overlapping portions of a frequency band to first and second multicarrier modulation schemes, respectively (block 1102). The first and second multicarrier modulation schemes have first and second subcarrier spacings, respectively, and the first and second subcarrier spacings differ from one another. The method may include transmitting data to one or more wireless devices in the first time interval, using the first and second multicarrier modulation schemes in the first and second portions of the frequency band (block 1104). The method further includes, for a second time interval, allocating third and fourth non-overlapping portions of a frequency band to third and fourth multicarrier modulation schemes, respectively (block 1106). The third and fourth multicarrier modulation schemes have third and fourth subcarrier spacings, respectively, and the third and fourth subcarrier spacings differ from one another. The third and fourth portions differ from the first and second portions or the third and fourth multicarrier modulation schemes differ from the first and second multicarrier modulation schemes, or both. The method may include transmitting data to one or more wireless devices in the second time interval, using the third and fourth multicarrier modulation schemes in the third and fourth portions of the frequency band (block 1108). It is noted that this operation may continue for later time intervals, whether they are consecutive or not.

In some cases, a first or second time interval is dependent on the number of modulation symbols used, according to a multicarrier modulation scheme, for the first, second, third or fourth subcarrier spacing. In some cases, the length of the first or second time interval defines a point in time for allocation of the first, second, third and fourth portions of the frequency band and/or the respective subcarrier spacings.

The processor 42 of the processing circuit 32 may execute a computer program 46 stored in the memory 44 that configures the processor 42 to operate the network access node as a receiver that performs multicarrier demodulation. The processor 42 is thus configured to, in a first time interval, receive and demodulate data from a first portion of a frequency band, using a first multicarrier modulating scheme having a first subcarrier spacing. The processor 42 is also configured to, in a second time interval, receive and demodulate data from a second portion of the frequency band, using a second multicarrier modulating scheme having a second subcarrier spacing. The first subcarrier spacing differs from the second subcarrier spacing. This structure and functionality may also be referred to as or be a part of modulation/demodulation circuitry 40 in the processing circuit 32.

Figure 12:
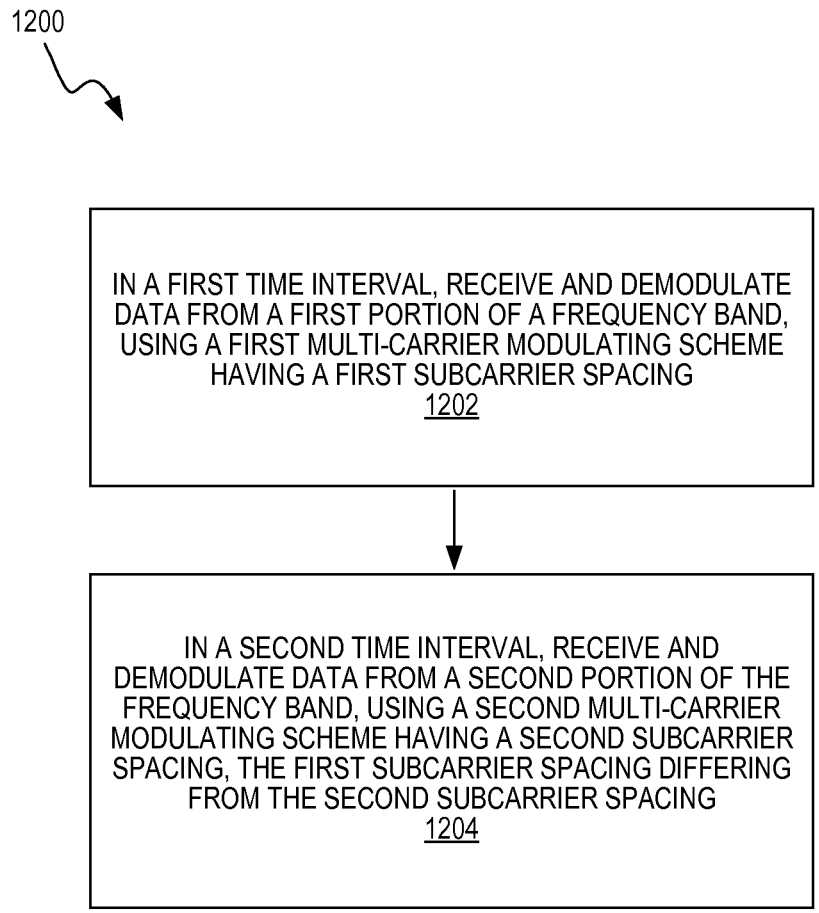
FIG. 12 illustrates a method in a receiver node for multicarrier demodulation, according to some embodiments.

In some embodiments, the processing circuit 32 is configured to perform a method for multicarrier demodulation, such as method 1200. For example, FIG. 12 illustrates a method 1200 that includes, in a first time interval, receiving and demodulating data from a first portion of a frequency band, using a first multicarrier modulating scheme having a first subcarrier spacing (block 1202). The method 1200 further includes, in a second time interval, receiving and demodulating data from a second portion of the frequency band, using a second multicarrier modulating scheme having a second subcarrier spacing (block 1204). The first subcarrier spacing differs from the second subcarrier spacing.

The network access node 30 may be referred to as a node, network node or a radio network node. Network access node 30 can be any kind of network access node that may include a base station, radio base station, base transceiver station, evolved Node B (eNodeB), Node B, relay node, access point, wireless access point, radio access point, UltraDense Network (UDN)/Software Defined Network (SDN) radio access node, Remote Radio Unit (RRU), Remote Radio Head (RRH), etc.

Figure 13:
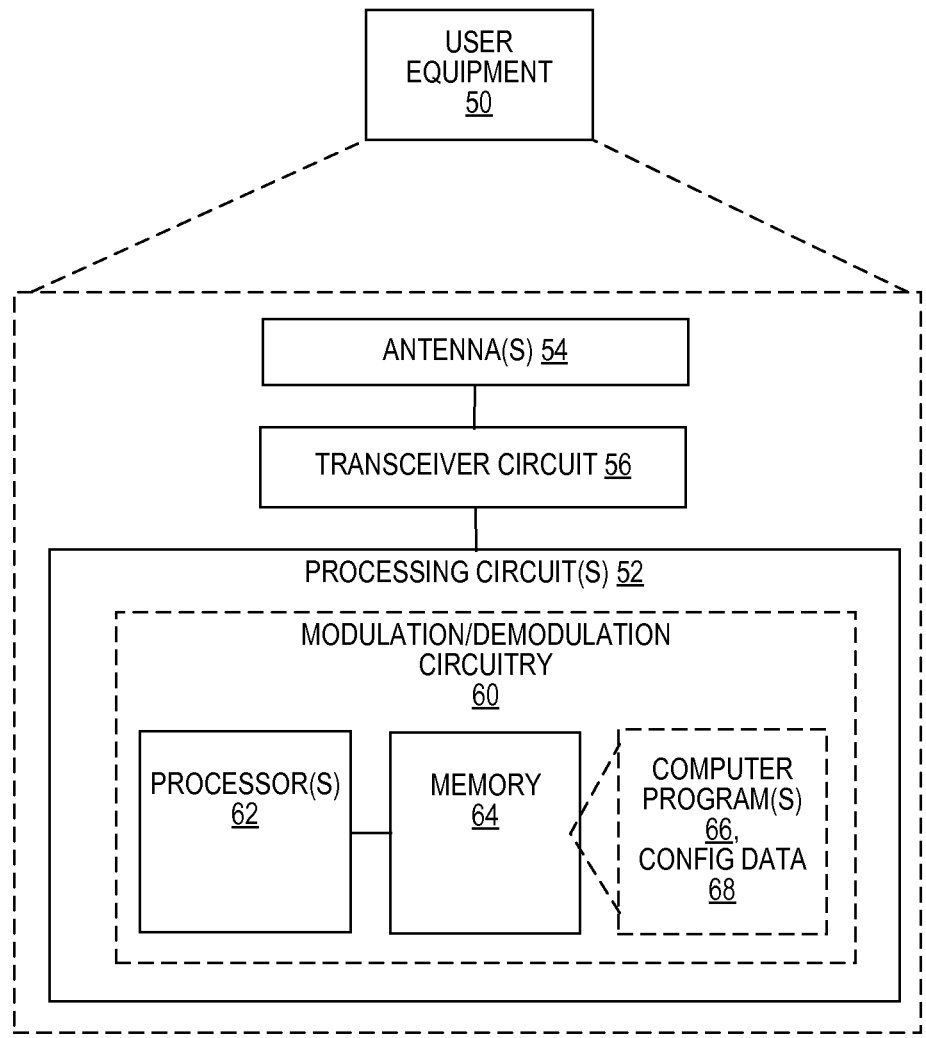
FIG. 13 illustrates a block diagram of a user equipment, according to some embodiments.

FIG. 13 illustrates a diagram of a wireless device, such as a user equipment 50, according to some embodiments. To ease explanation, the user equipment 50 may also be considered to represent any wireless devices that may operate in a network. The UE 50 herein can be any type of wireless device capable of communicating with network node or another UE over radio signals. The UE 50 may also be radio communication device, target device, device to device (D2D) UE, machine type UE or UE capable of machine to machine communication (M2M), a sensor equipped with UE, PDA (personal digital assistant), Tablet, mobile terminals, smart phone, laptop embedded equipped (LEE), laptop mounted equipment (LME), USB dongles, Customer Premises Equipment (CPE), etc.

The UE 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50, whether or not part of modulation/demodulation circuitry 60, may be configured to perform at least the modulation and demodulation techniques illustrated in FIGS. 4-12. For example, the processor 62 of the processor circuit 52 may execute a computer program 66 stored in the memory 64 that configures the processor 62 to operate as a transmitter, as explained above for processor 42 of the network access node 30. This functionality may be performed by modulation/demodulation circuitry 60 in processing circuit 52. The processing circuit 52 of the UE 50 is configured to perform a method for multicarrier modulation, such as method 1100 of FIG. 11.

The processor 62 of the processor circuit 52 may execute a computer program 66 stored in the memory 64 that configures the processor 62 to operate the user equipment node 50 as a receiver, as explained above for processor 42 of the network access node 30. This functionality may be performed by modulation/demodulation circuitry 60 in processing circuit 52. The processing circuit 52 of the UE 50 is also configured to perform a method for multicarrier demodulation, such as method 1200 of FIG. 12.

In some cases, a transmitter node, such as network access node 30, may be configured to operate with both such modulation and demodulation techniques, while a receiver node, such as UE 50, is merely able to receive and demodulate the symbols intended for it.

In some embodiments, the processing circuitry 40, 60 is configured to evaluate service requirements corresponding to data to be transmitted to wireless devices in two different, perhaps consecutive, time intervals. Based on the evaluation, first and second portions of a frequency band can be allocated to first and second multicarrier modulation schemes for a first time interval, while third and fourth portions of a time the frequency band are allocated to third and fourth multicarrier modulation schemes for a second time interval. In some cases, service requirements for the wireless devices can be received prior to the evaluation of the service requirements.

The device capabilities of the wireless devices can also affect the allocations. Such device capabilities may include information regarding the capability of respective wireless devices to receive and demodulate the symbols placed in time intervals, where the subcarrier spacings may vary from time interval to time interval. For example, device capability information may indicate that a first wireless device can operate using only a using only a single multicarrier modulation scheme. Therefore, at least one portion of the frequency band in the first and/or second time interval is allocated to the single multicarrier modulation scheme in response to said indication. It may follow that different modulation schemes may be used for different devices within the same time interval and/or over multiple consecutive time intervals.

Figure 14:
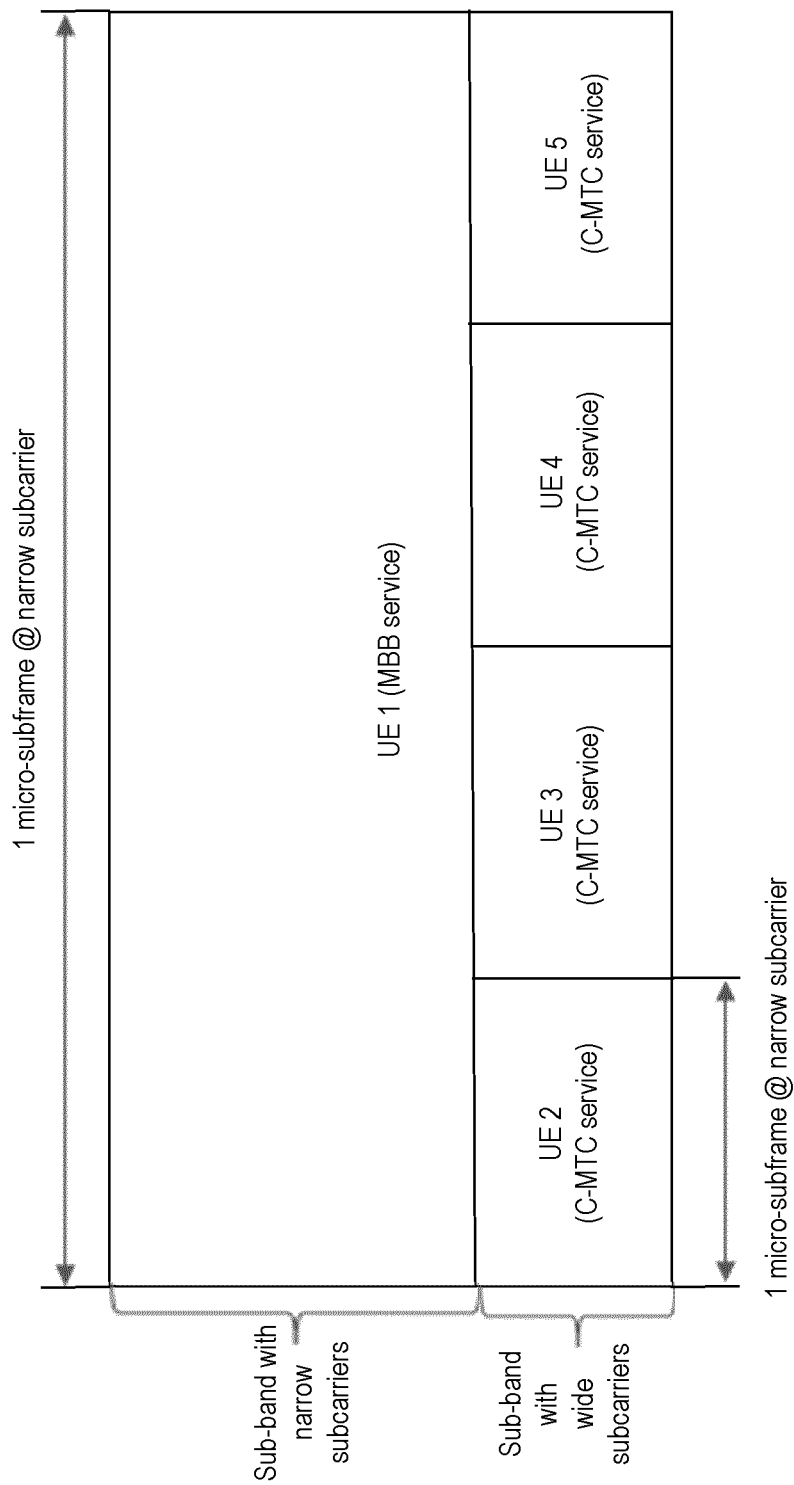
FIG. 14 illustrates an example signal diagram for a time interval, according to some embodiments.

In some embodiments, the network access node 30 and/or the UE 50 are configured to operate in a dedicated mode of operation with fixed service requirement, such as a QoS requirement. In this case, a terminal device (UE) operates in a particular dedicated (pre-coded) multicarrier mode. Note that (pre-coded) multicarrier could be (but not limited to) OFDM, FBMC, DFT-spread OFDM (DFTS-OFDM), pre-coded FBMC and generalized frequency-division multiplexing (GFDM). Of course, this case does not restrict its interoperability with other devices using different (dedicated or mixed) multicarrier modes. As a non-limiting example, consider a simple illustration with only two multicarrier modes as shown in FIG. 14. UE1 supports only mobile broadband (MBB) traffic with long symbols and UE2 supports only C-MTC traffic with short symbols. Both kinds of devices are being served by a single base station (BS) supporting mixed mode multicarrier. However, different frequency sub-bands are used by different multicarrier modes. Multicarrier configuration of a UE can be passed on to the corresponding network access node 30, or BS, via control signaling at the time when the UE connects to the network. The multicarrier configuration for a particular UE will remain the same as long as the UE is connected to the network or as long as the QoS needs are not changed.

Figure 15:
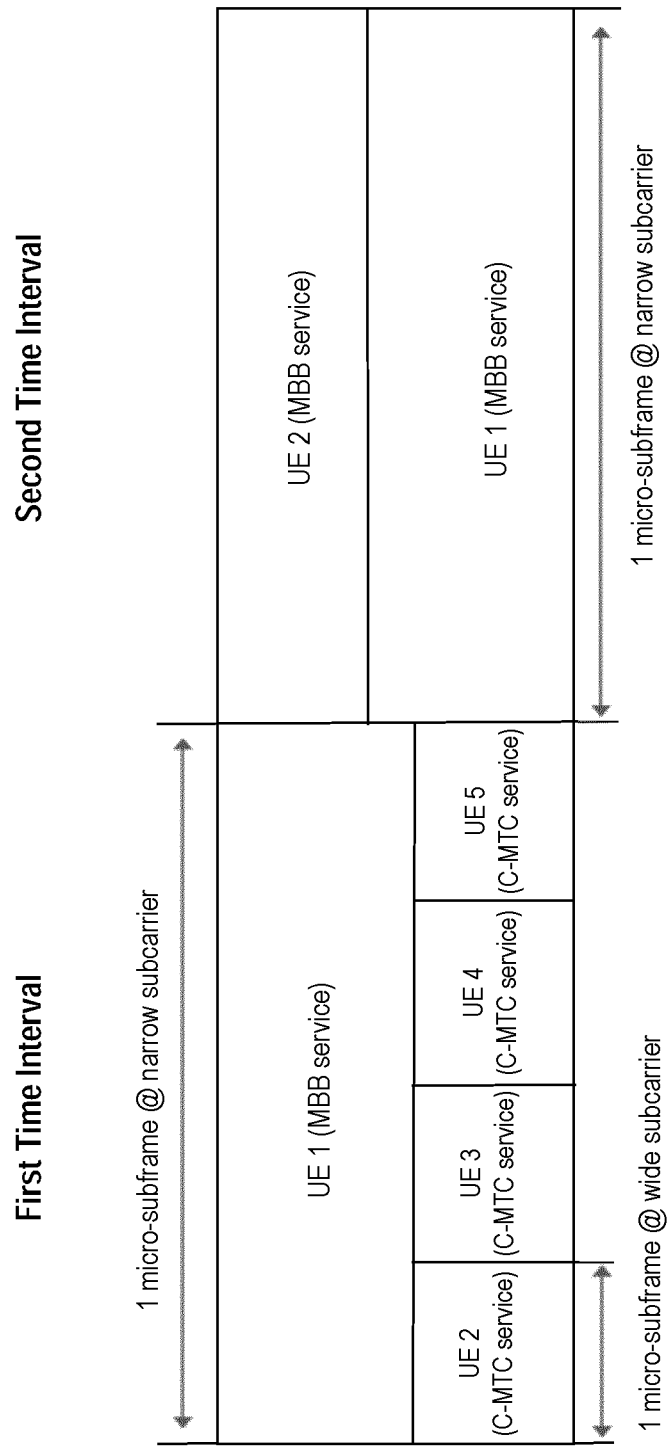
FIG. 15 illustrates an example signal diagram of mixed mode OFDM for consecutive time intervals, according to some embodiments.

In other embodiments, the network access node 30 and/or the UE 50 may be configured to support a mixed mode of multicarrier operation with a variable service requirement, such as a variable QoS requirement. FIG. 15 shows the case when UE 2 operates on different multicarrier modes based on the QoS requirements. This case can be considered a more generic case for a terminal device (or UE) with multiple service classes. Corresponding to the service class, an appropriate multicarrier mode is selected. As a non-limiting example, consider mixed multicarrier mode of two for simplicity. In order to support both C-MTC and MBB type of traffic, the device itself or BS selects the short symbol for C-MTC traffic to adhere to strict timeliness requirements while it uses long symbols for MBB (or other non-critical) traffic.

Control signaling can occur between the UE and the BS using a default multicarrier configuration (for example, multicarrier mode with smallest symbol size). A UE (or BS) can select the multicarrier configuration based on the traffic QoS requirement and signal the BS (or device) in PUCCH (or PDCCH) or other similar control channels (using a default configuration), about the selected multicarrier configuration. For example, depending upon the total number of supported multicarrier options in the mixed mode operation, a few bits can be reserved in SR or PDCCH to indicate the selected multicarrier mode.

In some embodiments, no mode is selected, as in the case of Control Channel Usage. For emergency C-MTC services like alarm signals or command messages with data size is smaller than a certain threshold, a modulation technique may make use of the PUCCH itself to transmit data. The BS in this case will not explicitly allocate any resources. The control signal will use the default multicarrier mode so that the BS and the UE do not have to exchange any control overhead in order to agree on the multicarrier mode. Alternatively, PUCCH can be configured with one of the available multicarrier numerologies, e.g., the short symbol numerology due to strict latency requirements.

In some embodiments, a scheme for the reallocation of an already allocated resource is described in the case when a real-time data traffic requirement emerges and there is no free resource available. The BS accommodates the emerged real-time traffic in place of an already allocated resource with less latency critical demands. Obviously, the less time-critical service is reallocated to other resources available in the system.

Figure 16:
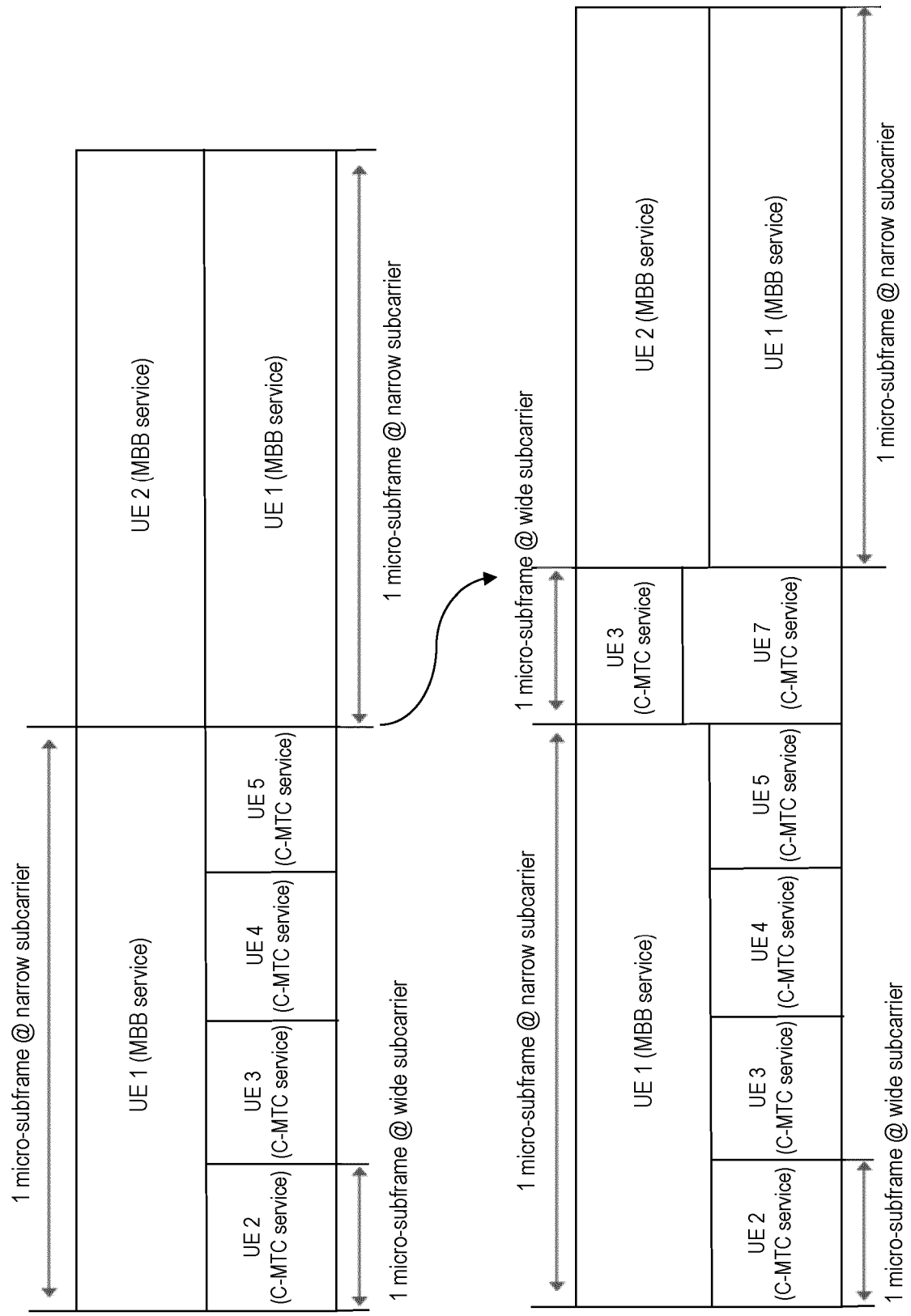
FIG. 16 illustrates an example signal diagram of mixed mode OFDM for consecutive time intervals, according to some embodiments.

The reallocation process could involve a new multicarrier configuration based on the service class. A non-limiting illustration of this process is shown in FIG. 16. It can be noted from the top of FIG. 16 that all the system resources are occupied at the time instant when the traffic from UE3 and UE7 with strict timeliness requirements emerges. While delaying UE3 and UE7 resource allocation to a potentially future micro-subframe would not meet the QoS demands, an already allocated resource to UE1 and UE2 can be made available since UE1 and UE2 do not have time-critical traffic QoS requirements. The process of allocating resources to UE3 and UE7 and reallocating resources to UE1 and UE2 is illustrated in FIG. 16 at the bottom. It is worth noticing that while reallocating the resource to UE3 and UE7, the OFDM configuration is also changed appropriately.

Figure 17:
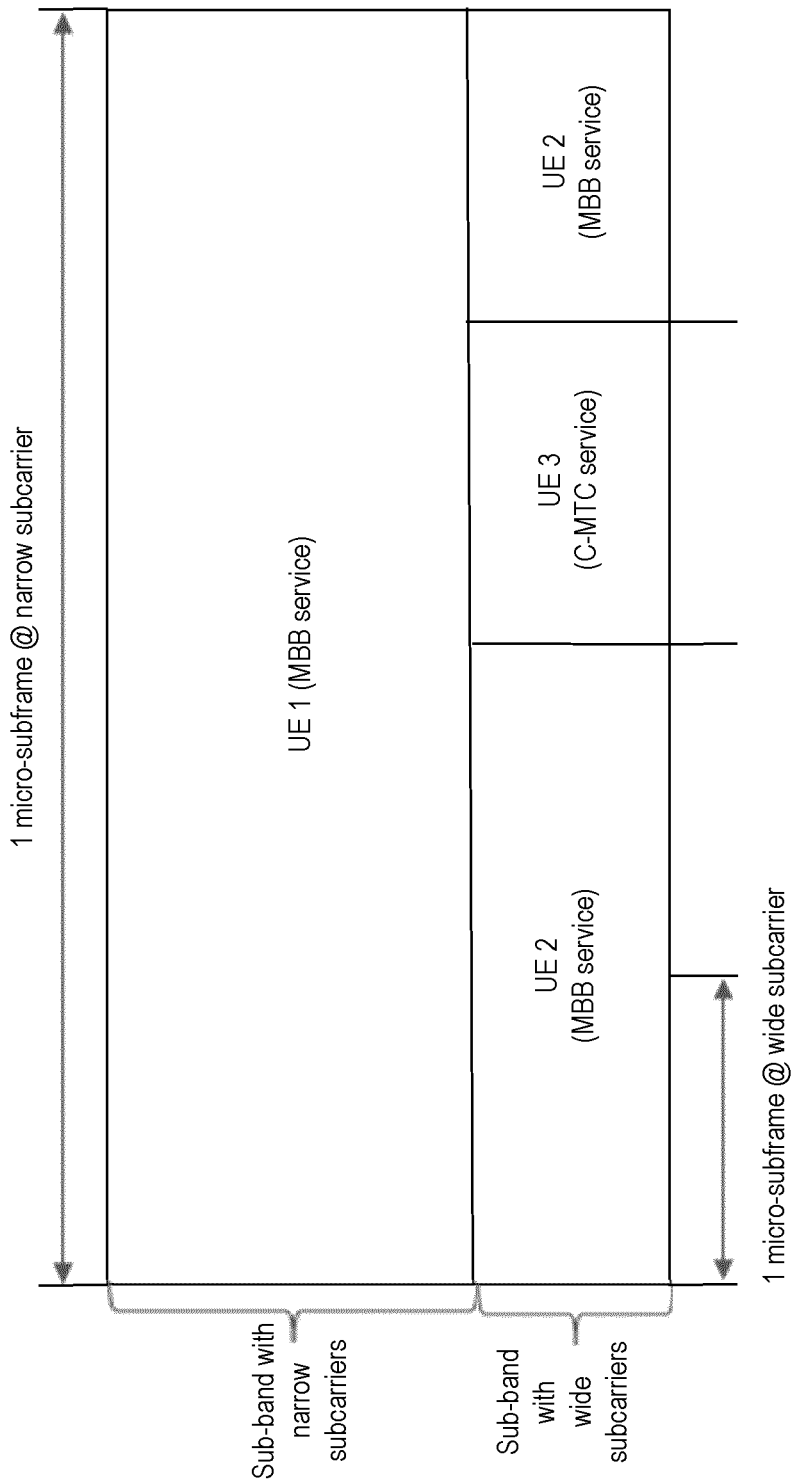
FIG. 17 illustrates an example signal diagram for a time interval, according to some embodiments.

In some embodiments, critical data can be prioritized per micro-subframe of the OFDM mode with a widest available subcarrier. FIG. 17 shows prioritization of critical data. If frequency-division duplex (FDD) duplexing is supported on a device terminal or UE, the UE must listen to downlink assignments on the smallest possible micro-subframe level while carrying out transmission. In this way, if the critical data arrives, there is a possibility of taking resources (time and/or frequency) from UE with non-critical service. This requires extra signaling to the UE with non-critical data to halt its transmission.

Figure 18:
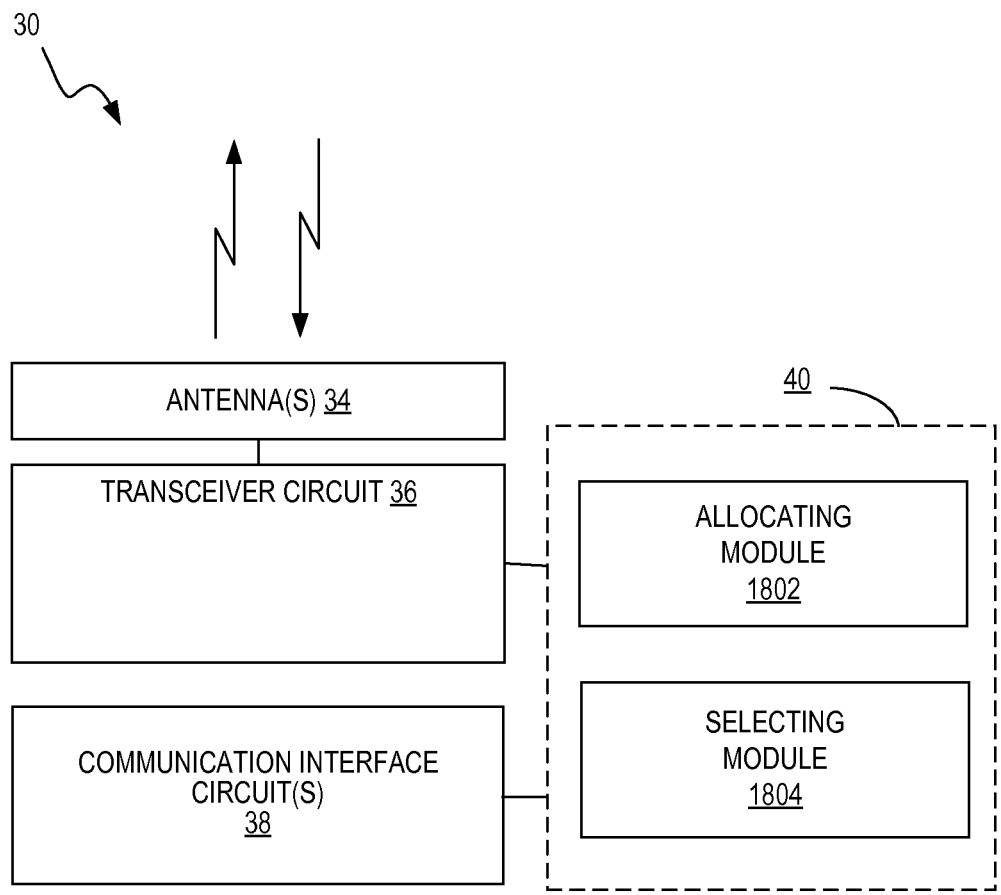
FIG. 18 illustrates a functional implementation of a network access node operating as a transmitter node, according to some embodiments.

FIG. 18 illustrates an example functional module or circuit architecture as may be implemented in the network access node 30 operating as a transmitter node, e.g., based on the modulation/demodulation circuitry 40. The illustrated embodiment at least functionally includes an allocating module 1802 for, a first time interval, allocating first and second non-overlapping portions of a frequency band to first and second multicarrier modulation schemes, respectively. The first and second multicarrier modulation schemes have first and second subcarrier spacings, respectively, and the first and second subcarrier spacings differ from one another. The embodiment also includes a transmitting module 1804 for transmitting data to one or more wireless devices in the first time interval, using the first and second multicarrier modulation schemes in the first and second portions of the frequency band. The allocation module 1802 is also configured, for a second time interval, for allocating third and fourth non-overlapping portions of a frequency band to third and fourth multicarrier modulation schemes, respectively. The third and fourth multicarrier modulation schemes have third and fourth subcarrier spacings, respectively, and the third and fourth subcarrier spacings differ from one another. The third and fourth portions differ from the first and second portions or the third and fourth multicarrier modulation schemes differ from the first and second multicarrier modulation schemes, or both. The transmitting module 1804 is also configured for transmitting data to one or more wireless devices in the second time interval, using the third and fourth multicarrier modulation schemes in the third and fourth portions of the frequency band.

Figure 19:
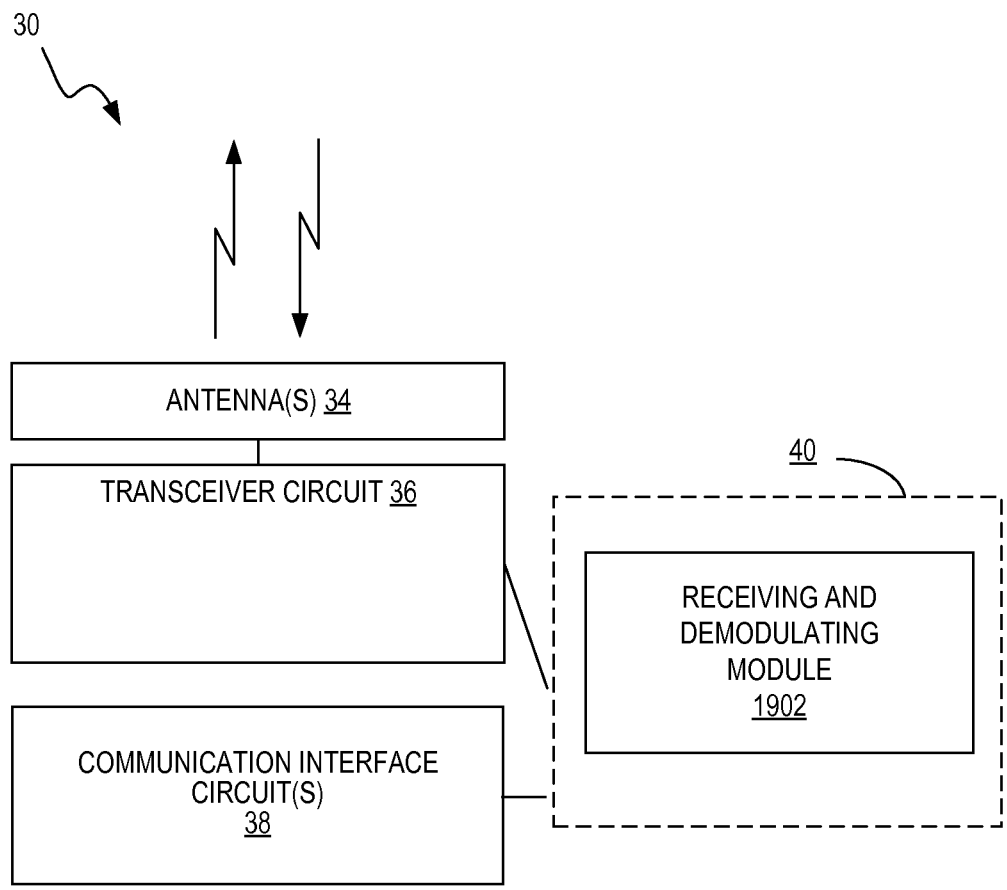
FIG. 19 illustrates a functional implementation of a network access node operating as a receiver node, according to some embodiments.

FIG. 19 illustrates an example functional module or circuit architecture as may be implemented in the network access node 30 operating as a receiver node, e.g., based on the modulation/demodulation circuitry 40. The illustrated embodiment at least functionally includes a receiving and demodulating nodule 1902 for, in a first time interval, receiving and demodulating data from a first portion of a frequency band, using a first multicarrier modulating scheme having a first subcarrier spacing. The receiving and demodulating module 1902 is also configured for, in a second time interval, receiving and demodulating data from a second portion of the frequency band, using a second multicarrier modulating scheme having a second subcarrier spacing. The first subcarrier spacing differs from the second subcarrier spacing.

Figure 20:
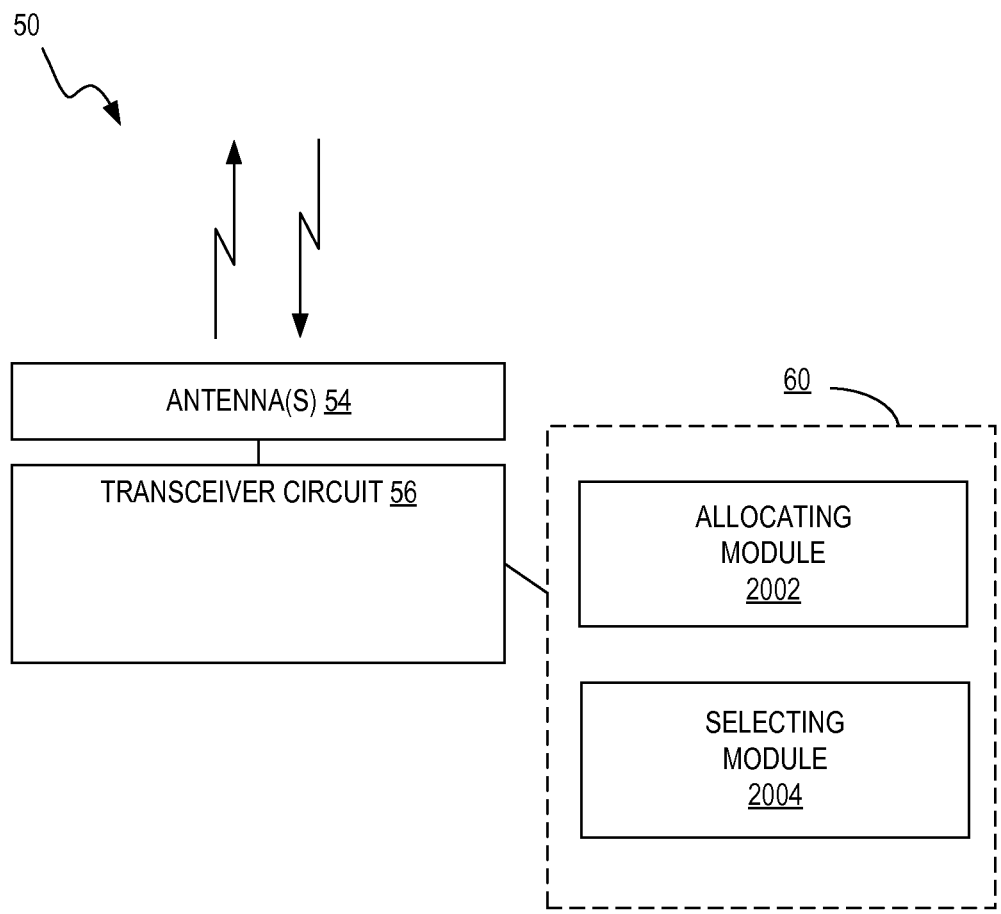
FIG. 20 illustrates a functional implementation of a user equipment operating as a transmitter node, according to some embodiments.

FIG. 20 illustrates an example functional module or circuit architecture as may be implemented in the user equipment node 50 operating as a transmitter node, e.g., based on the modulation/demodulation circuitry 60. The illustrated embodiment at least functionally includes an allocating module 2002, for a first time interval, for allocating first and second non-overlapping portions of a frequency band to first and second multicarrier modulation schemes, respectively. The first and second multicarrier modulation schemes have first and second subcarrier spacings, respectively, and the first and second subcarrier spacings differ from one another. The embodiment also includes a transmitting module 2004 for transmitting data to one or more wireless devices in the first time interval, using the first and second multicarrier modulation schemes in the first and second portions of the frequency band. The allocating module 2002 is also configured, for a second time interval, for allocating third and fourth non-overlapping portions of a frequency band to third and fourth multicarrier modulation schemes, respectively. The third and fourth multicarrier modulation schemes have third and fourth subcarrier spacings, respectively, and the third and fourth subcarrier spacings differ from one another. The third and fourth portions differ from the first and second portions or the third and fourth multicarrier modulation schemes differ from the first and second multicarrier modulation schemes, or both. The transmitting module 2004 is also configured for transmitting data to one or more wireless devices in the second time interval, using the third and fourth multicarrier modulation schemes in the third and fourth portions of the frequency band.

Figure 21:
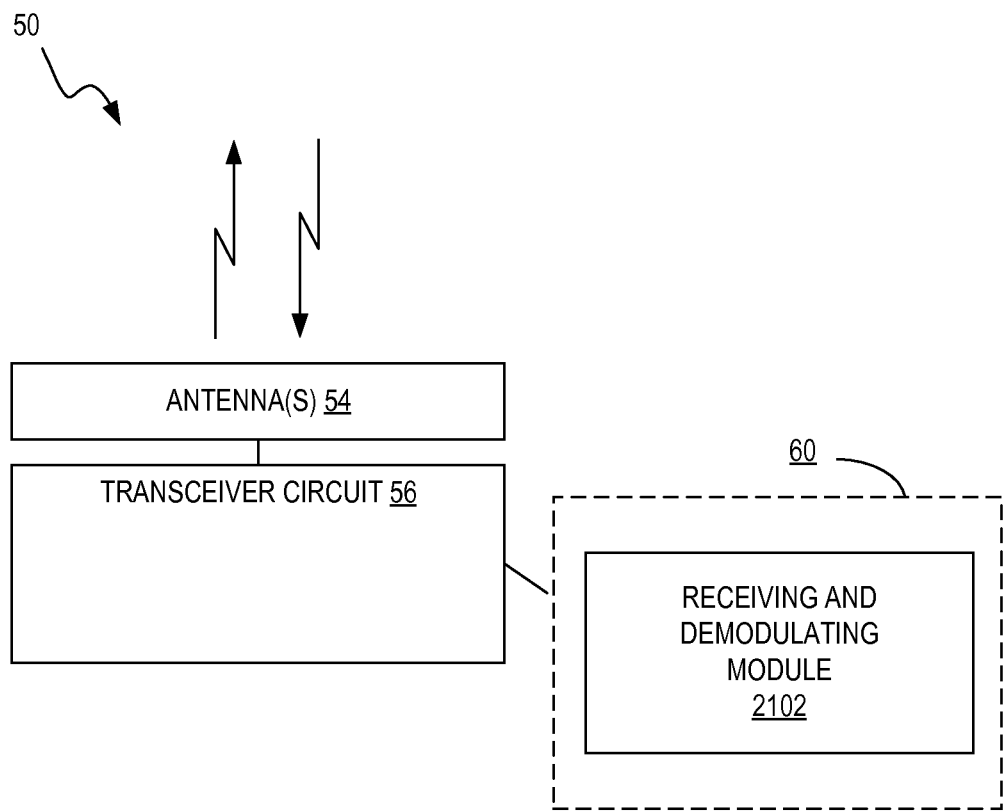
FIG. 21 illustrates a functional implementation of a user equipment operating as a receiver node, according to some embodiments.

FIG. 21 illustrates an example functional module or circuit architecture as may be implemented in the user equipment node 50 operating as a receiver node, e.g., based on the modulation/demodulation circuitry 60. The illustrated embodiment at least functionally includes a receiving and demodulating module 2102 for, in a first time interval, receiving and demodulating data from a first portion of a frequency band, using a first multicarrier modulating scheme having a first subcarrier spacing. The receiving and demodulating module 2104 is also configured for, in a second time interval, receiving and demodulating data from a second portion of the frequency band, using a second multicarrier modulating scheme having a second subcarrier spacing. The first subcarrier spacing differs from the second subcarrier spacing.

The embodiments described herein provide a number of advantages. For example, advantages include higher performance through more granular dynamic resource management. The embodiments allow a system to fulfill a wide range of QoS requirements. Advantages also include allowing the efficient management of resources among devices supporting mixed mode multicarrier operation with varying degree of application traffic QoS demands. The system is also allowed to reallocate resources in order meet the strict timeliness requirements of emerging unpredictable traffic. Having the capability to reallocate resources at runtime enables handling of alarms in C-MTC use cases and dealing with dynamic requirements.

Advantages also include enabling a system to achieve efficient coexistence of devices having dedicated capabilities (also different but fixed capabilities) with devices supporting mixed mode operation. Devices with a single (dedicated) mode of operation simplify the hardware and hence reduce the device cost. Moreover, this indirectly helps a system in lowering the power consumption budget. It is highly likely that efficient coexistence and the management of devices with different multicarrier modes is to be required.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method comprising:
   receiving service requirements for one or more wireless devices from the respective wireless devices;
   evaluating the service requirements corresponding to data to be transmitted to the wireless devices in a first time interval and a second time interval;
   for the first time interval, allocating first and second non-overlapping portions of a frequency band to first and second multicarrier modulation schemes, respectively, the first and second multicarrier modulation schemes having first and second subcarrier spacings, respectively, the first and second subcarrier spacings differing from one another; and
   for the second time interval, allocating third and fourth non-overlapping portions of a frequency band to third and fourth multicarrier modulation schemes, respectively, the third and fourth multicarrier modulation schemes having third and fourth subcarrier spacings, respectively, wherein the third and fourth subcarrier spacings differ from one another, wherein the allocating of the first and second portions of the frequency band to the first and second multicarrier modulation schemes for the first time interval and the allocating of the third and fourth portions of the frequency band to the third and fourth multicarrier modulation schemes for the second time interval are based on said evaluating of service requirements, and wherein the third and fourth portions differ from the first and second portions or the third and fourth multicarrier modulation schemes differ from the first and second multicarrier modulation schemes, or both.

2. The method of claim 1, further comprising:

transmitting data to one or more wireless devices in the first time interval, using the first and second multicarrier modulation schemes in the first and second portions of the frequency band; and transmitting data to one or more wireless devices in the second time interval, using the third and fourth multicarrier modulation schemes in the third and fourth portions of the frequency band.

3. The method of claim 1, further comprising evaluating device capability information for one or more wireless devices to be scheduled in the first and second time intervals, wherein the allocating of the first and second portions of the frequency band to the first and second multicarrier modulation schemes for the first time interval and the allocating of the third and fourth portions of the frequency band to the third and fourth multicarrier modulation schemes for the second time interval are based on said evaluating device capability information.

4. The method of claim 3, further comprising receiving device information for one or more wireless devices from the respective wireless devices, prior to said evaluating device capability information.

5. The method of claim 3, wherein the device capability information indicates that a first wireless device can operate using only a single multicarrier modulation scheme, and wherein at least one portion of the frequency band in the first and/or second time interval is allocated to the single multicarrier modulation scheme in response to said indication.

6. The method of claim 1, further comprising transmitting data to a second wireless device in each of the first and second time intervals, using differing multicarrier modulation schemes in the respective time intervals.

7. The method of claim 1, wherein the first or second time interval is dependent on the number of modulation symbols used, according to a multicarrier modulation scheme, for a the first, second, third or fourth subcarrier spacing.

8. The method of claim 1, wherein the first and second time intervals are consecutive in time.

9. The method of claim 1, wherein the length of the first or second time interval defines a point in time for allocation of the first, second, third and fourth portions of the frequency band and/or the respective subcarrier spacings.

10. A method comprising:

sending, to a remote transmitting device, prior to a first interval and a second time interval, an indication of service requirements for data to be transmitted to the wireless device in the first and second time intervals, for evaluating the service requirements corresponding to data to be transmitted to the wireless devices in a first time interval and a second time interval;

in the first time interval, receiving and demodulating data from a first portion of a frequency band, using a first multicarrier modulation scheme having a first subcarrier spacing; and in the second time interval, receiving and demodulating data from a second portion of the frequency band, using a second multicarrier modulation scheme having a second subcarrier spacing;

wherein the first subcarrier spacing differs from the second subcarrier spacing, and wherein the data is received according to an allocation of the first portion of the frequency band to the first multicarrier modulation scheme for the first time interval and an allocation of the second portion of the frequency band to the second multicarrier modulation scheme for the second time interval, which are based on said evaluating of service requirements.

11. The method of claim 10, wherein the first portion of the frequency band is different from the second portion of the frequency band.

12. The method of claim 10, further comprising sending to the remote transmitting device, prior to the first and second time intervals, an indication of the wireless device's capabilities with respect to receiving multicarrier modulation schemes.

13. The method of claim 10, further comprising sending to the remote transmitting device, prior to the first and second time intervals, an indication of a requested multicarrier modulation scheme.

14. A wireless transmitter, comprising:

a transceiver circuit configured to transmit and receive wireless transmissions according to multicarrier modulation schemes; and a processing circuit operatively connected to the transceiver circuit and configured to:

receive service requirements for one or more wireless devices from the respective wireless devices;

evaluate the service requirements corresponding to data to be transmitted to the wireless devices in a first time interval and a second time interval;

for the first time interval, allocate first and second non-overlapping portions of a frequency band to first and second multicarrier modulation schemes, respectively, the first and second multicarrier modulation schemes having first and second subcarrier spacings, respectively, the first and second subcarrier spacings differing from one another; and for the second time interval, allocate third and fourth non-overlapping portions of a frequency band to third and fourth multicarrier modulation schemes, respectively, the third and fourth multicarrier modulation schemes having third and fourth subcarrier spacings, respectively, wherein the third and fourth subcarrier spacings differ from one another, wherein the allocating of the first and second portions of the frequency band to the first and second multicarrier modulation schemes for the first time interval and the allocating of the third and fourth portions of the frequency band to the third and fourth multicarrier modulation schemes for the second time interval are based on said evaluating of service requirements, and wherein the third and fourth portions differ from the first and second portions or the third and fourth multicarrier modulation schemes differ from the first and second multicarrier modulation schemes, or both.

15. The wireless transmitter of claim 14, wherein the transceiver circuit is configured to:
transmit data, via the transceiver circuit, to one or more wireless devices in the first time interval, using the first and second multicarrier modulation schemes in the first and second portions of the frequency band; and
transmit data, via the transceiver circuit, to one or more wireless devices in the second time interval, using the third and fourth multicarrier modulation schemes in the third and fourth portions of the frequency band.

16. The wireless transmitter of claim 14, wherein the processing circuit is configured to evaluate device capability information for one or more wireless devices to be scheduled in the first and second time intervals and to perform the allocating of the first and second portions of the frequency band to the first and second multicarrier modulation schemes for the first time interval and the allocating of the third and fourth portions of the frequency band to the third and fourth multicarrier modulation schemes for the second time interval based on said evaluation of device capability information.

17. The wireless transmitter of 16, wherein the processing circuit is configured to receive device information for one or more wireless devices from the respective wireless devices, prior to said evaluation of device capability information.

18. The wireless transmitter of claim 16, wherein the device capability information indicates that a first wireless device can operate using only a single multicarrier modulation scheme, and wherein the wireless transmitter is configured to allocate at least one portion of the frequency band in the first and/or second time interval to the single multicarrier modulation scheme in response to said indication.

19. The wireless transmitter of claim 14, wherein the processing circuit is configured to transmit data to a second wireless device in each of the first and second time intervals, using differing multicarrier modulation schemes in the respective time intervals.

20. The wireless transmitter of claim 14, wherein the first or second time interval is dependent on the number of modulation symbols used, according to a multicarrier modulation scheme, for a the first, second, third or fourth subcarrier spacing.

21. The wireless transmitter of claim 14, wherein the first and second time intervals are consecutive in time.

22. The wireless transmitter of claim 14, wherein the length of the first or second time interval defines a point in time for allocation of the first, second, third and fourth portions of the frequency band and/or the respective subcarrier spacings.

23. A wireless receiver, comprising:
a transceiver circuit configured to transmit and receive wireless transmissions according to multicarrier modulation schemes; and
a processing circuit operatively connected to the transceiver circuit and configured to:
send, to a remote transmitting device, prior to a first interval and a second time interval, an indication of service requirements for data to be transmitted to the wireless device in the first and second time intervals, for evaluating the service requirements corresponding to data to be transmitted to the wireless devices in a first time interval and a second time interval;
in the first time interval, receive and demodulate data from a first portion of a frequency band, using a first multicarrier modulation scheme having a first subcarrier spacing; and
in the second time interval, receive and demodulate data from a second portion of the frequency band, using a second multicarrier modulation scheme having a second subcarrier spacing;
wherein the first subcarrier spacing differs from the second subcarrier spacing, and wherein the data is received according to an allocation of the first portion of the frequency band to the first multicarrier modulation scheme for the first time interval and an allocation of the second portion of the frequency band to the second multicarrier modulation scheme for the second time interval, which are based on said evaluating of service requirements.

24. The wireless receiver of claim 23, wherein the first portion of the frequency band is different from the second portion of the frequency band.

25. The wireless receiver of claim 23, wherein the processing circuit is configured to send to the remote transmitting device, prior to the first and second time intervals, an indication of the wireless device's capabilities with respect to receiving multicarrier modulation schemes.

26. The wireless receiver of claim 23, wherein the processing circuit is configured to send to the remote transmitting device, prior to the first and second time intervals, an indication of a requested multicarrier modulation scheme.

27. A non-transitory computer-readable storage medium storing a computer program comprising program instructions that, when executed on a processing circuit of a transmitter, cause the processing circuit to:
receive service requirements for one or more wireless devices from the respective wireless devices;
evaluate the service requirements corresponding to data to be transmitted to the wireless devices in a first time interval and a second time interval;
for the first time interval, allocate first and second non-overlapping portions of a frequency band to first and second multicarrier modulation schemes, respectively, the first and second multicarrier modulation schemes having first and second subcarrier spacings, respectively, the first and second subcarrier spacings differing from one another; and
for the second time interval, allocate third and fourth non-overlapping portions of a frequency band to third and fourth multicarrier modulation schemes, respectively, the third and fourth multicarrier modulation schemes having third and fourth subcarrier spacings, respectively, wherein the third and fourth subcarrier spacings differ from one another,
wherein the allocating of the first and second portions of the frequency band to the first and second multicarrier modulation schemes for the first time interval and the allocating of the third and fourth portions of the frequency band to the third and fourth multicarrier modulation schemes for the second time interval are based on said evaluating of service requirements, and wherein the third and fourth portions differ from the first and second portions or the third and fourth multicarrier modulation schemes differ from the first and second multicarrier modulation schemes, or both.

28. A non-transitory computer-readable storage medium storing a computer program comprising program instructions that, when executed on a processing circuit of a receiver, cause the processing circuit to:
send, to a remote transmitting device, prior to a first interval and a second time interval, an indication of service requirements for data to be transmitted to the wireless device in the first and second time intervals, for evaluating the service requirements corresponding to data to be transmitted to the wireless devices in a first time interval and a second time interval;

in the first time interval, receive and demodulate data from a first portion of a frequency band, using a first multicarrier modulation scheme having a first subcarrier spacing; and in the second time interval, receive and demodulate data from a second portion of the frequency band, using a second multicarrier modulation scheme having a second subcarrier spacing;

wherein the first subcarrier spacing differs from the second subcarrier spacing, and wherein the data is received according to an allocation of the first portion of the frequency band to the first multicarrier modulation scheme for the first time interval and an allocation of the second portion of the frequency band to the second multicarrier modulation scheme for the second time interval, which are based on said evaluating of service requirements.

* * * * *

UNITED STATES PATENT AND TRADEMARK OFFICE
CERTIFICATE OF CORRECTION

PATENT NO. : 10,523,378 B2
APPLICATION NO. : 15/737586
DATED : December 31, 2019
INVENTOR(S) : Ashraf et al.

Page 1 of 1

It is certified that error appears in the above-identified patent and that said Letters Patent is hereby corrected as shown below:

In the Specification

In Column 7, Line 13, delete "Processing circuitry 32," and insert -- Processing circuit 32, --, therefor.

In the Claims

In Column 17, Lines 52-53, in Claim 7, delete "for a the first," and insert -- for the first, --, therefor.

In Column 19, Line 23, in Claim 17, delete "of 16," and insert -- of claim 16, --, therefor.

In Column 19, Line 42, in Claim 20, delete "for a the first," and insert -- for the first, --, therefor.

Signed and Sealed this
Nineteenth Day of May, 2020

Andrei Iancu
*Director of the United States Patent and Trademark Office*